United States Patent
Greenwood et al.

(10) Patent No.: US 7,242,841 B2
(45) Date of Patent: Jul. 10, 2007

(54) CROSS-CONNECT FIBER OPTIC CABLES AND ASSOCIATED CROSS-CONNECT SECTIONS

(75) Inventors: Jody L. Greenwood, Hickory, NC (US); Kenneth D. Temple, Jr., Newton, NC (US); David L. Dean, Jr., Hickory, NC (US); Keith H. Lail, Connelly Springs, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 286 days.

(21) Appl. No.: 11/068,360

(22) Filed: Feb. 28, 2005

(65) Prior Publication Data

US 2006/0193573 A1    Aug. 31, 2006

(51) Int. Cl.
*G02B 6/00* (2006.01)
(52) U.S. Cl. .......... 385/137; 385/134; 385/135; 385/136; 385/99; 385/100; 385/103; 385/113
(58) Field of Classification Search .......... 385/15, 385/24, 27, 30, 31, 39, 50, 100, 53, 66, 70, 385/71, 76, 77, 84, 114, 95, 96, 98, 99, 103, 385/113, 134–137; 398/50, 56
See application file for complete search history.

(56) References Cited

U.S. PATENT DOCUMENTS

| | | | |
|---|---|---|---|
| 4,805,979 A * | 2/1989 | Bossard et al. | 385/135 |
| 4,961,623 A | 10/1990 | Midkiff et al. | 350/96.2 |
| 5,832,162 A * | 11/1998 | Sarbell | 385/99 |
| 6,466,725 B2 * | 10/2002 | Battey et al. | 385/135 |
| 6,619,697 B2 * | 9/2003 | Griffioen et al. | 285/126.1 |
| 6,748,174 B2 * | 6/2004 | Milton et al. | 398/79 |
| 6,792,207 B2 * | 9/2004 | Iannone et al. | 398/51 |
| 2003/0138252 A1 * | 7/2003 | Paiam et al. | 398/49 |
| 2006/0193573 A1 * | 8/2006 | Greenwood et al. | 385/103 |

FOREIGN PATENT DOCUMENTS

| | | |
|---|---|---|
| DE | 3537684 | 4/1987 |
| JP | 62-054204 | 3/1987 |
| JP | 2001116968 | 4/2001 |

* cited by examiner

*Primary Examiner*—Brian M. Healy

(57) ABSTRACT

A flexible cross-connect apparatus for cross-connecting fiber optic cables includes a transition strength member, at least one cable clamp assembly, at least one fiber storage device, and a cover for protecting the cross-connect apparatus. The cross-connect apparatus is flexible about a preferential bending plane because the transition strength member includes a preferential bending plane for influencing bending. The at least one cable clamp assembly is used for securing one or more cables with the transition strength member at the ends. In one embodiment, a splice carriage is removably attached to the transition strength member for aiding the craftsman to work at a splicing station.

25 Claims, 25 Drawing Sheets

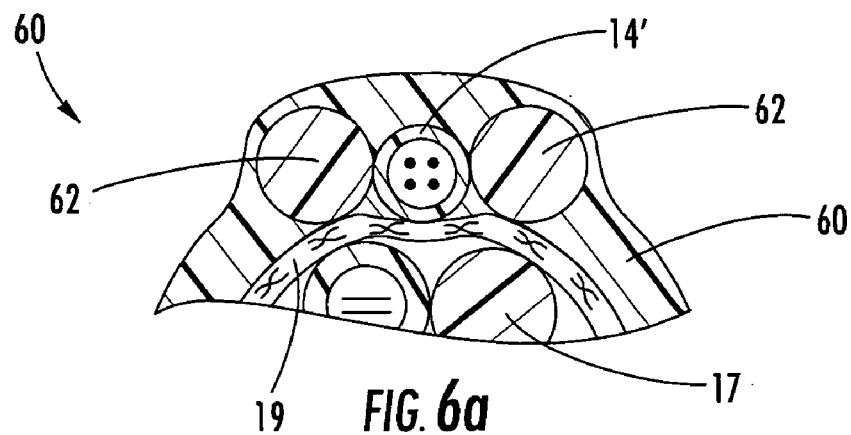
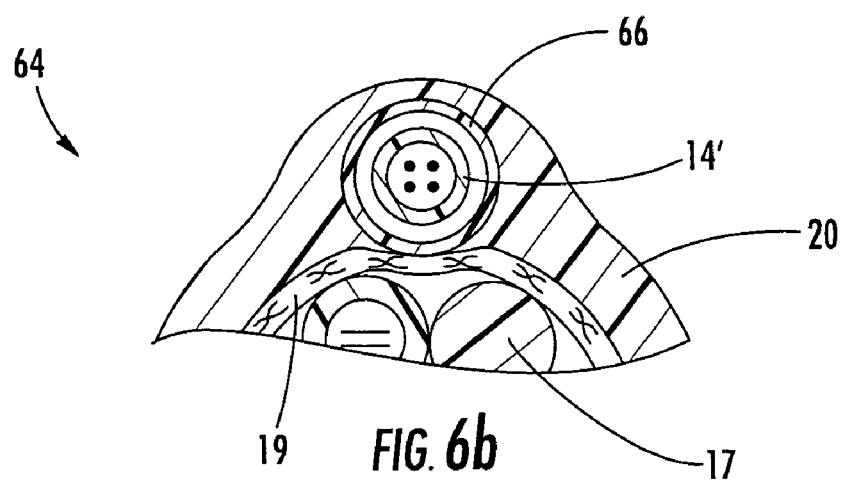

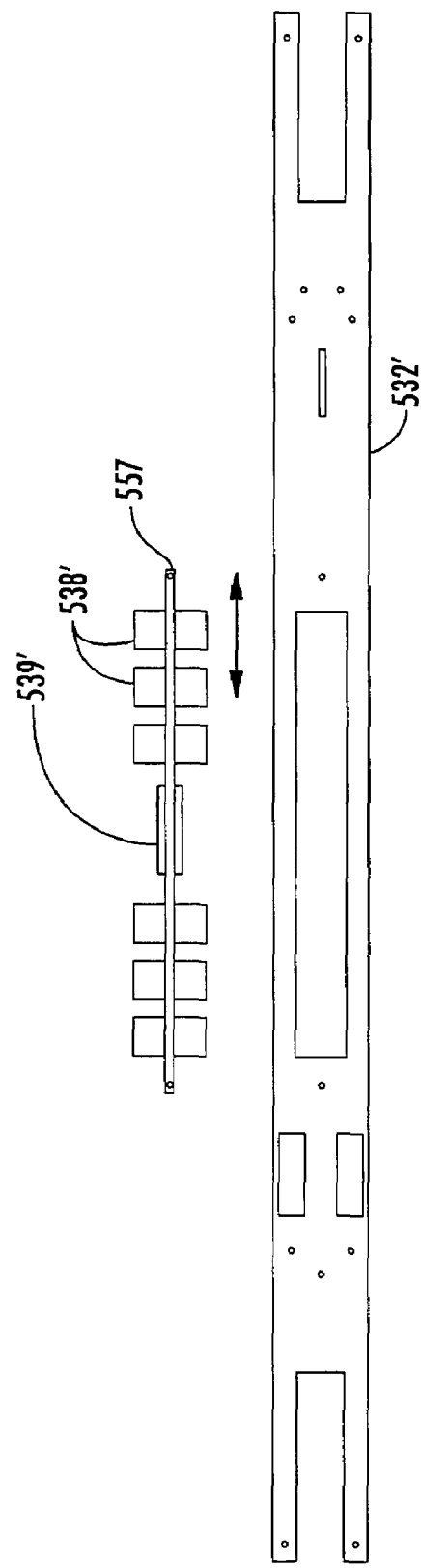

US 7,242,841 B2

CROSS-CONNECT FIBER OPTIC CABLES AND ASSOCIATED CROSS-CONNECT SECTIONS

RELATED APPLICATIONS

The present application is related to U.S. patent application Ser. No. 11/068,426, 11/068,613, and 11/068,591 respectively titled "Distribution fiber optic cables having at least one access location and methods of making the same", "Distribution fiber optic cables having at least one access optical fiber", and "Loose tube fiber optic cables having at least one access location" filed on even date herewith.

FIELD OF THE INVENTION

The present invention relates generally to a cross-connect apparatus and cross-connect optical fiber cables using the cross-connect apparatus. The cross-connect apparatus allows for the cross-connecting and/or optical fiber management in upstream and downstream portions of the cable while maintaining a flexible package.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical waveguide cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the optical fiber long-hauls links.

As optical waveguides are deployed deeper into communication networks, subscribers will have access to increased bandwidth. But certain obstacles exist that make it challenging and/or expensive to route optical waveguides/optical cables closer to the subscriber. For instance, the connection of subscribers to the distribution fiber optic cable requires a low-cost solution that is craft-friendly for installation, connectorization, and versatility. Moreover, the reliability and robustness of the distribution fiber optic cable must withstand the rigors of an outdoor environment.

SUMMARY OF THE INVENTION

The present invention is directed to a flexible cross-connect apparatus for cross-connecting fiber optic cables. The cross-connect apparatus includes a transition strength member, at least one cable clamp assembly, at least one fiber storage device, and a cover for protecting the cross-connect apparatus. The cross-connect apparatus is flexible about a preferential bending plane because the transition strength member includes a preferential bending plane for influencing bending, thereby allowing the cross-connect apparatus to be wound on a cable reel. The at least one cable clamp assembly is used for securing one or more cables with the transition strength member at the ends. In one embodiment, a splice carriage is removably attached to the transition strength member for aiding the craftsman to work at a splicing station.

BRIEF DESCRIPTION OF THE DRAWINGS

FIGS. 6a and 6b depict portions of distribution fiber optic cable having alternative structures of the access location.

FIG. 15a depicts the cross-connect strength member of FIGS. 15 and 16 and FIG. 15b depicts an alternative transition strength member having a splice carrier that is removable.

DETAILED DESCRIPTION OF THE INVENTION

Figure 1:
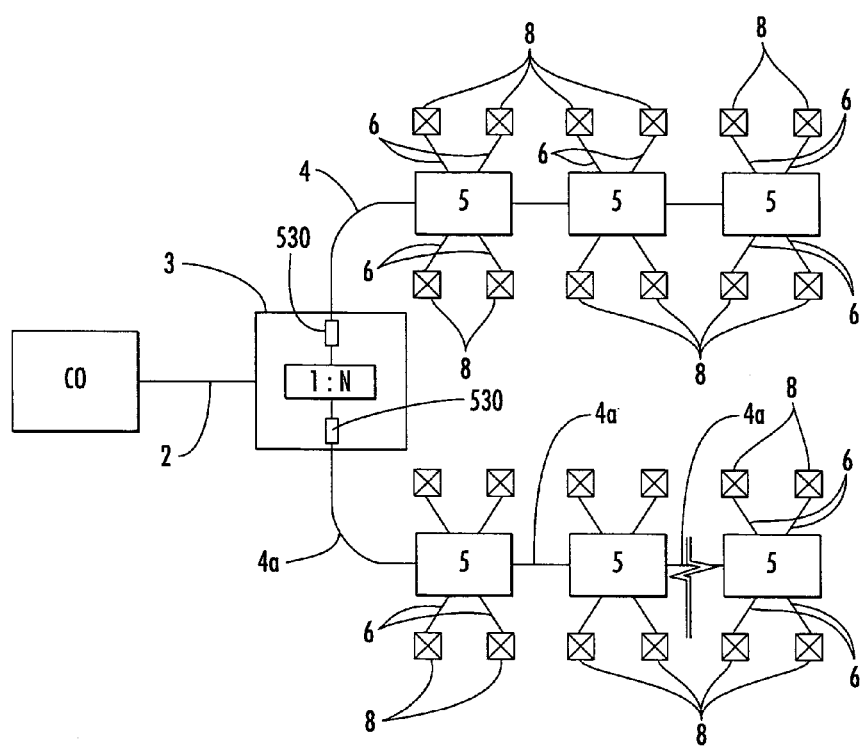
FIG. 1 schematically depicts a portion of an optical communication network for providing fiber to the subscriber at location 'x' (FTTx).

FIG. 1 schematically depicts a portion of a simplified optical waveguide network 1 in an exemplary fiber to the location 'x' (FTTx) architecture. 'x' in the acronym represents the end location of the optical fiber, for instance, FTTC is fiber to the curb. In this case, network 1 is a centralized splitting network showing a fiber to the premises (FTTP) application. FTTP architectures advantageously route at least one optical waveguide to the premises, thereby providing a high bandwidth connection to the subscriber 8. Applications to locations other than to the curb or premises are also possible. As depicted in FIG. 1, downstream from a central office CO, network 1 includes a feeder link 2, at least one fiber distribution hub (FDH) 3 having at least one 1:N splitter (not numbered), at least one distribution link 4,4a, at least one distribution terminal 5, and a plurality of drop links 6. As depicted, distribution links 4 and 4a have multiple access locations disposed at the respective distribution terminals 5 along its length. In this instance, feeder link 2 is routed to FDH where the optical fibers of feeder link 2 are split 1:N times. The splits from the 1:N splitter are optically connected with the respective distribution links 4,4a that feed the network downstream. As shown, distribution link 4 has three distribution terminals 5 where tap points exist for the connection of multiple subscribers 8 using a respective drop link 6. In other words, the desired number of optical fibers are provided from distribution link 4 to distribution terminal 5 such as a network access point, thereby providing service to the subscribers 8.

In this example, four optical fibers are provided at each distribution terminal 5, but any suitable numbers of optical fibers may be provided to distribution terminal 5. Also, only one 1:N splitter is shown at FDH 3, but any suitable number of splitters are possible. Additionally, FIG. 1 depicts a cross-connect apparatus 530 for cross-connecting optical fibers attached to an upstream end of distribution link 4 within the FDH 3.

Fiber optic cables according to the present invention are advantageous as distribution links because the cables provide quick and easy access to the optical waveguides in the factory, or in the field, at desired locations along the length of the cable. In other words, fiber optic cables of the present invention effectively and economically streamline the deployment and connectivity of optical waveguides in FTTx applications by providing one or more access locations along the length of the cable. In suitable embodiments, fiber optic cables of the present invention meet the rigors of the outdoor environment. Although, network 1 shows a simple configuration of one type of FTTx architecture, other optical networks architectures can employ the concepts of the present invention. For instance, the present invention is also suitable with a distributive splitting FTTx architecture. Additionally, other optical networks may include other suitable components such as distribution terminals, closures, amplifiers, couplers, transducers, or the like. Likewise, other optical networks besides FTTx architectures can also benefit from the features of the present invention such as indoor applications like multiple-dwelling units (MDUs).

Fiber optic cable embodiments of the present invention include one or more access locations that greatly reduce the risk of damage to the optical fibers compared with conventional mid-span access procedures. Moreover, the time required to access the optical fibers within the distribution cable is also significantly reduced with the present invention. Other embodiments of the present invention include fiber optic cables having fiber optic tether cables attached at the one or more access locations. Preconnectorization of the tether cables is also possible. The present invention also discloses transition cables having an upstream portion connected with a downstream portion using a cross-connect apparatus for cross-connecting and/or fiber management between the portions.

Figure 2:
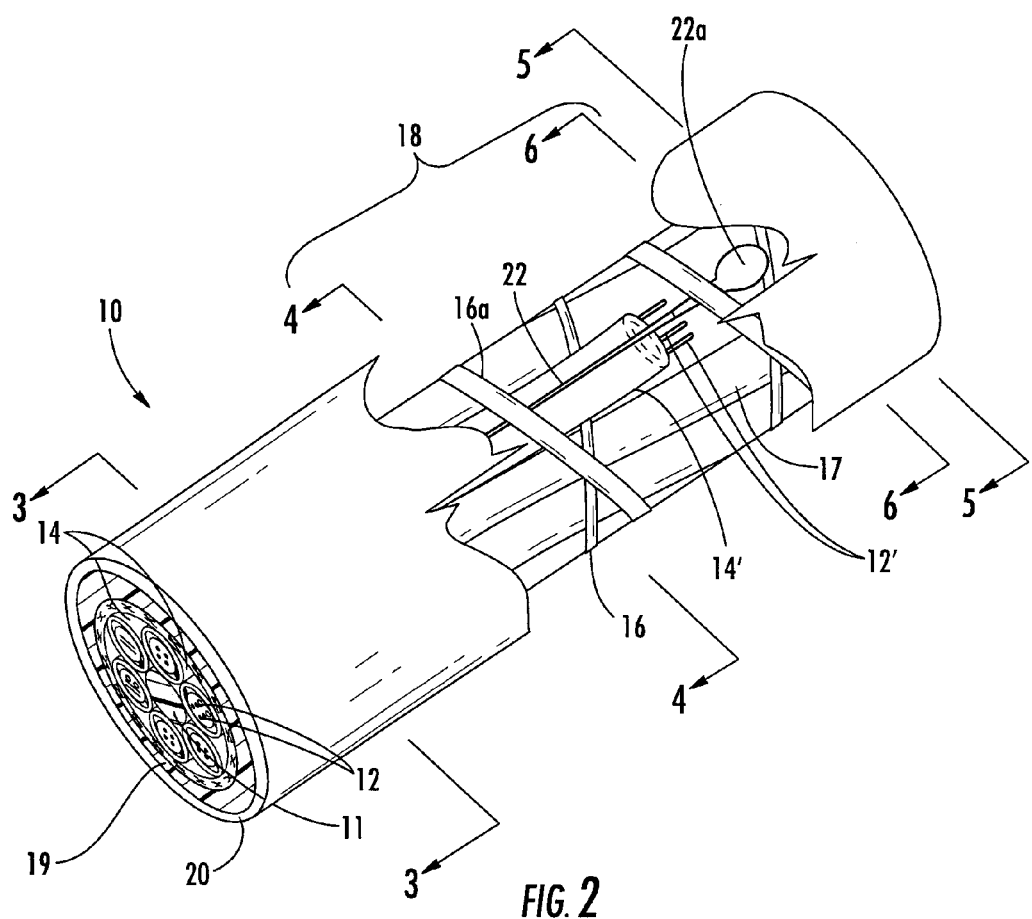
FIG. 2 is a perspective view of a distribution fiber optic cable according to one embodiment of the present invention with a portion of a cable jacket removed for clarity.
Figure 2A:
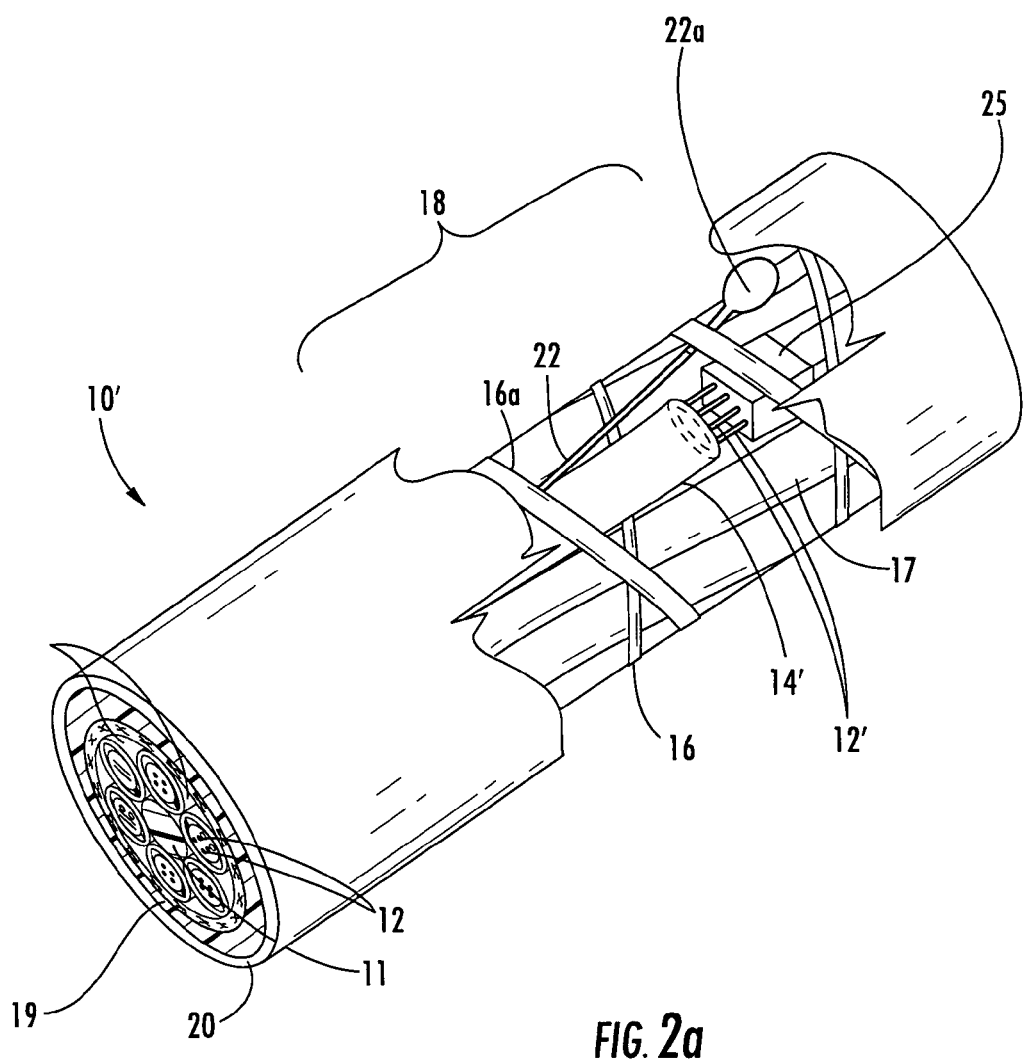
FIG. 2a is a perspective view of a distribution fiber optic cable similar to that shown in FIG. 2, except it further includes a ferrule.

FIG. 2 depicts a perspective view of an exemplary distribution fiber optic cable 10 (hereinafter cable 10) according to the present invention. As depicted, a portion of cable jacket 20 is removed from FIG. 2 so that certain details of cable 10 are visible. Cable 10 is a stranded loose tube cable construction; however, the concepts of the present invention are suitable with other types of cable constructions. Cable 10 includes a central member 11, a plurality of tubes 14 each having at least one optical fiber 12 disposed therein, at least one cable core binder 16, at least one filler component 17, at least one access location 18 (See FIG. 2), at least one water-swellable component 19 (removed from access location 18 for clarity), and a cable jacket 20. In this embodiment, tubes 14 are the optical fiber carriers for cable 10. Additionally, components such as ferrules, connectors, and/or a suitable optical splitter can be added during the manufacture of the distribution cable as depicted in FIG. 2a.

"Optical fiber carrier" means any protective structure that carries a portion of an optical fiber such as a tube, a tight-buffer layer, a ribbon matrix material, a U-shaped fiber carrier, a sheath or any other suitable carrier for protecting the optical fiber and/or the access optical fiber. In other words, cable designs according to the present invention can use any suitable optical fiber carrier. As used herein, "access location" refers to a predetermined location along the length of the cable where at least one optical waveguide is presented as an access optical fiber apart from a cable core so that it may be accessed without the need to breach the cable core. As used herein, "cable core" means a plurality of optical fibers and/or optical fiber carriers that are arranged in one or more arrays or groups to form the nucleus of the cable, where the one or more arrays or groups continue longitudinally over a portion of the cable length and excludes the access optical fiber disposed in the access location.

Figure 12:
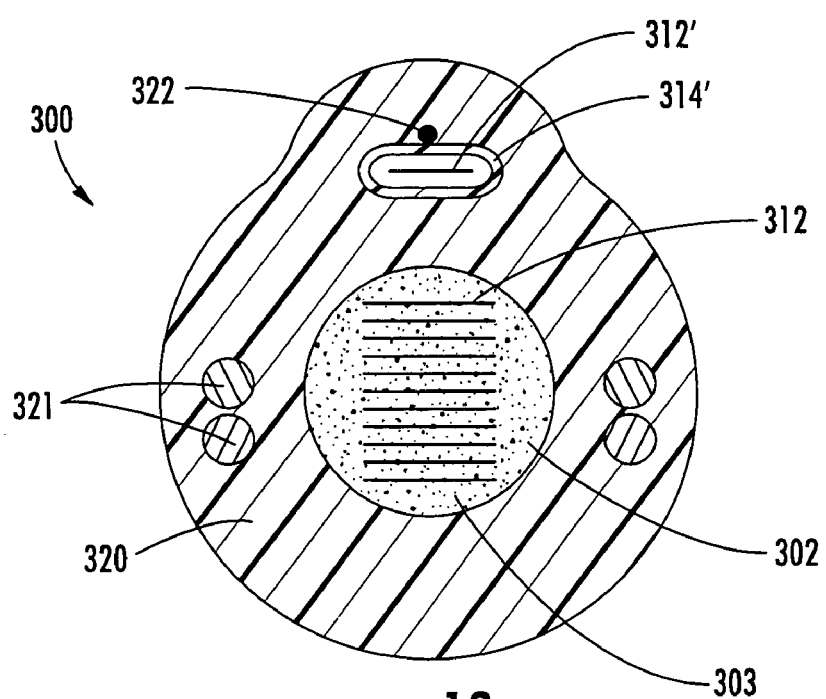
Figure 13:
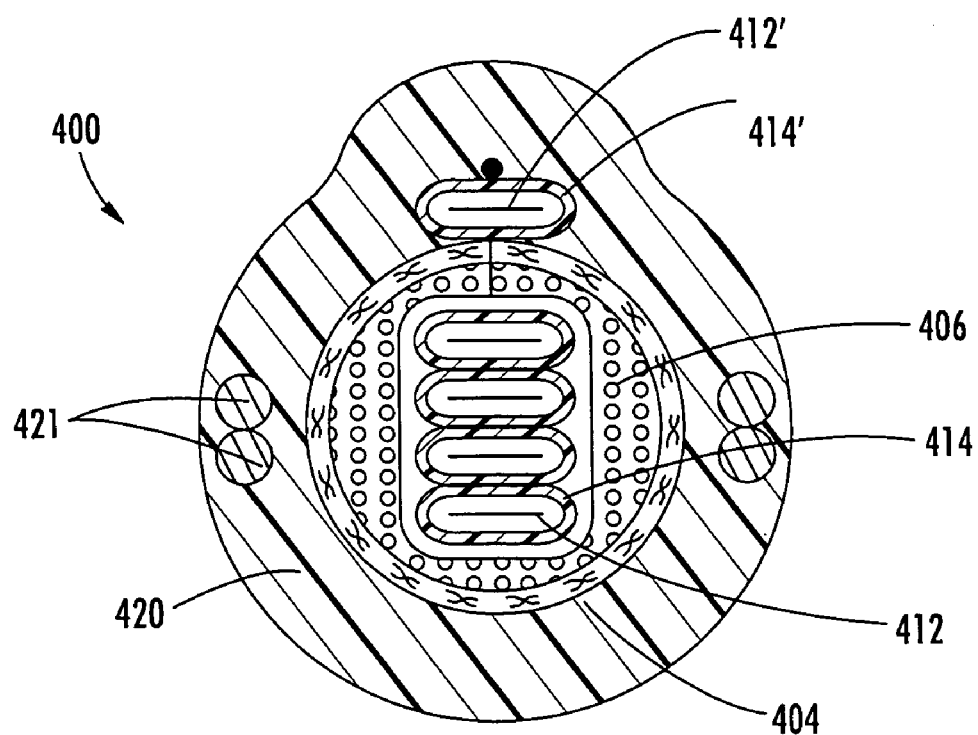

By way of example and not limitation, cable 10 of FIG. 2 depicts a plurality of tubes in an array of tubes that are stranded about a central member to form the cable core and the access tube is disposed apart from the cable core, cable 400 of FIG. 13 depicts a group of optical fiber ribbons disposed within optical fiber carriers that are generally wrapped by another cable component that forms the cable core and the access optical fibers are not grouped with the cable core, and cable 300 of FIG. 12 depicts a plurality of ribbon arrays disposed in a slotted member, thereby forming the cable core with the access optical fibers not within the slotted member.

Simply stated, distribution fiber optic cables of the present invention are manufactured with the access location structures disclosed herein, thereby providing a cable having at least one access optical fiber disposed within the cable before breaching the cable jacket. The construction of distribution cable assemblies is also disclosed herein. Cable manufacturing includes the processes or steps prior to and including jacketing of the same; whereas, construction of cable assemblies includes the processes or steps after jacketing.

Manufacturing cables of the present invention includes transitioning one or more optical fibers from a first location to a second location during the assembly of the cable core at specified longitudinal positions along the cable. Specifically, in transitioning from the first location to the second location one or more optical fibers may move from: (1) out of the cable core into an access location; and/or (2) from an access location into the cable core. For instance, one or more optical fibers are transitioned from a first location within the cable core to a second location apart from the cable core so that the transitioned optical fiber(s) become an access optical fiber(s). Likewise, one or more access optical fibers may transition from a position outside the cable core to a position within the cable core.

Figure 2B:
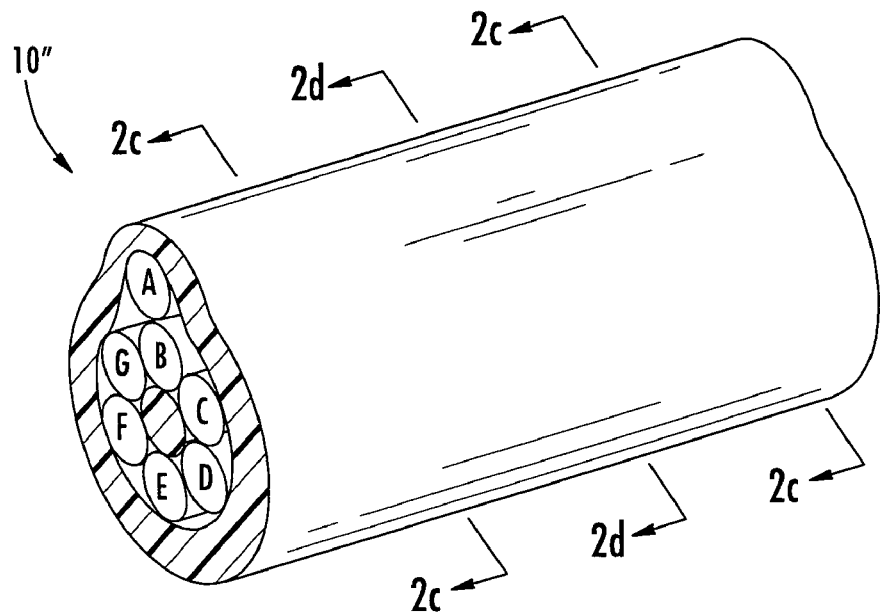
FIGS. 2b–2d respectively are perspective and cross-sectional representations of a distribution fiber optic cable showing various embodiments of the present invention.
Figure 2C:
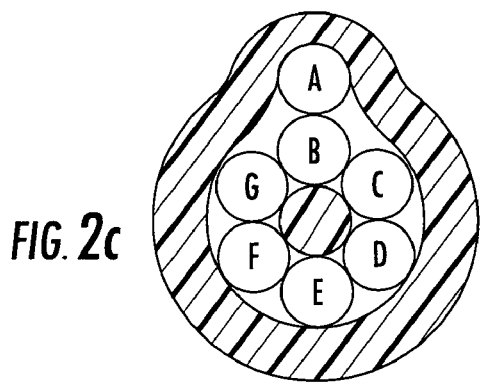
Figure 2D:
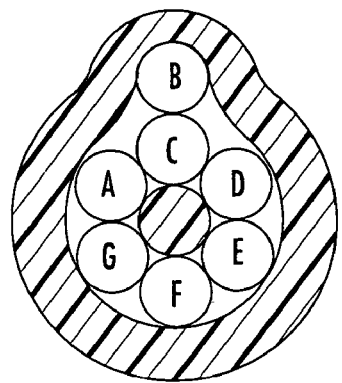
Figure 2E:
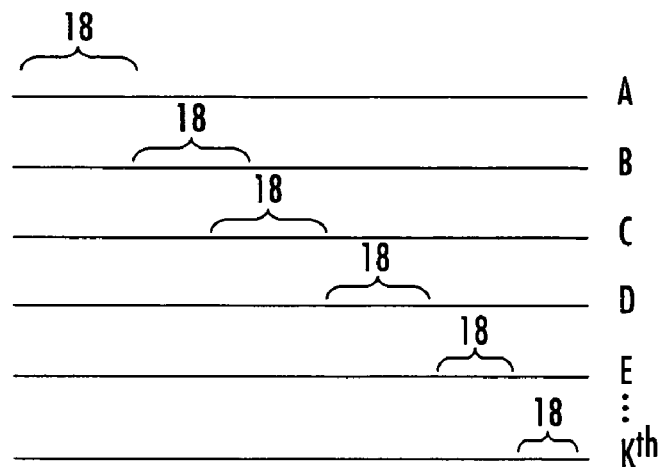
FIGS. 2e and 2f are schematic representations of fiber optic cables according to the present invention.
Figure 2F:
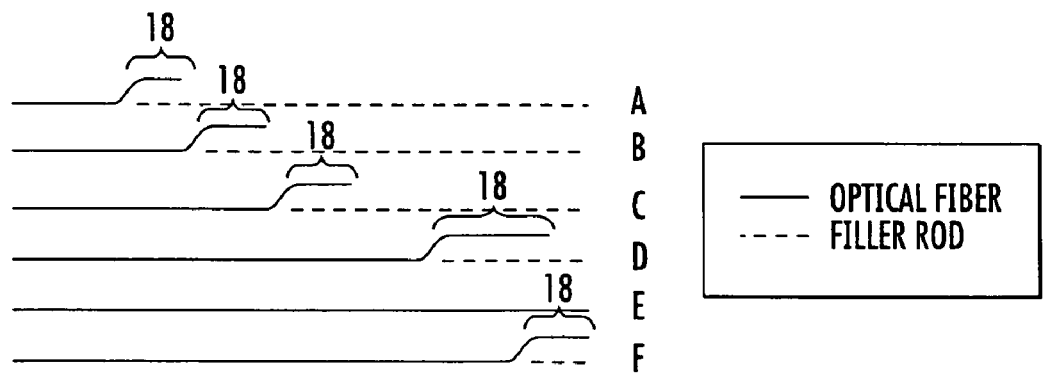
Figure 2G:
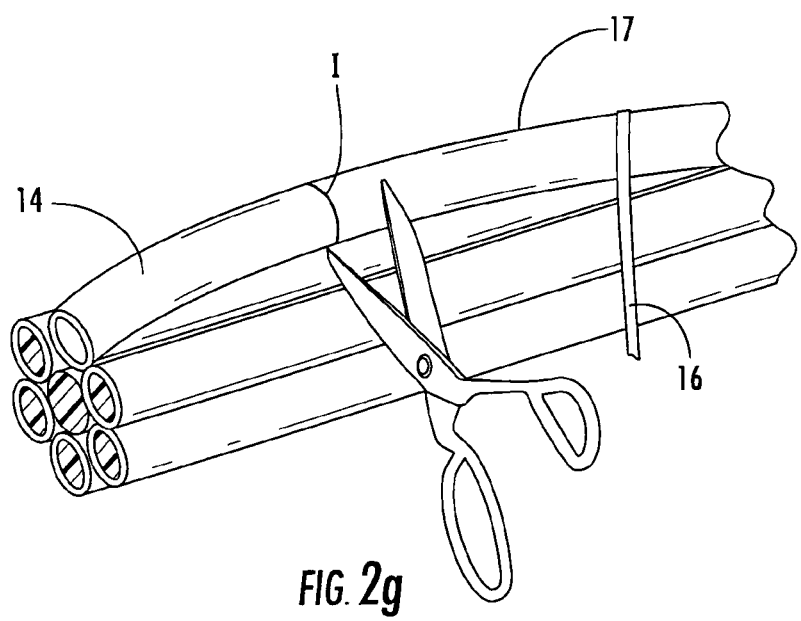
FIGS. 2g and 2h are a schematic representation of a explanatory portion of the manufacturing process according to the present invention.
Figure 2H:
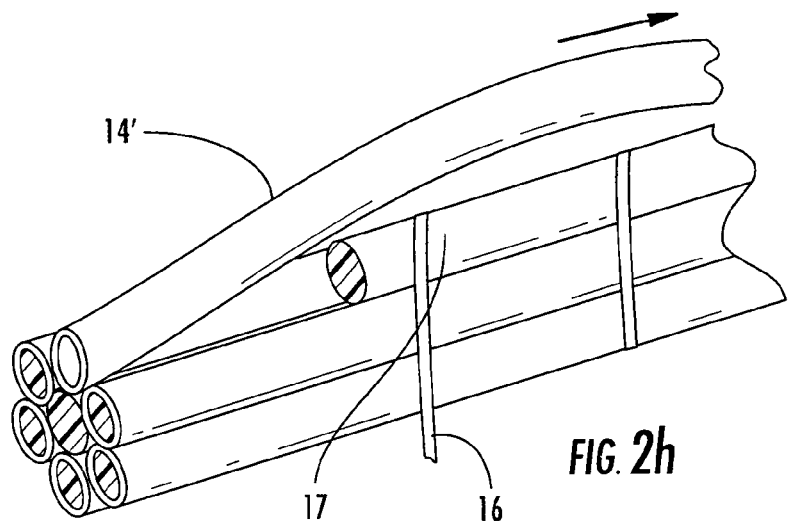

In other embodiments, at least one optical fiber can move from within the cable core to replace an access optical fiber that moves back into the cable core as schematically depicted in FIGS. 2b–2d, thereby shuffling one or more optical fibers into access locations and/or the cable core as desired. FIG. 2f schematically depicts introducing a filler component into the cable core near the transition for replacing the optical fiber that leaves the cable core. FIGS. 2g and 2h depict an explanatory method of manufacturing for introducing a filler component into the cable core, thereby making the transition from the first location to the second location during stranding of the cable core. Of course, other manufacturing variations are possible for transitioning one or more optical fiber carriers or optical fibers during the manufacturing process.

Figure 18:
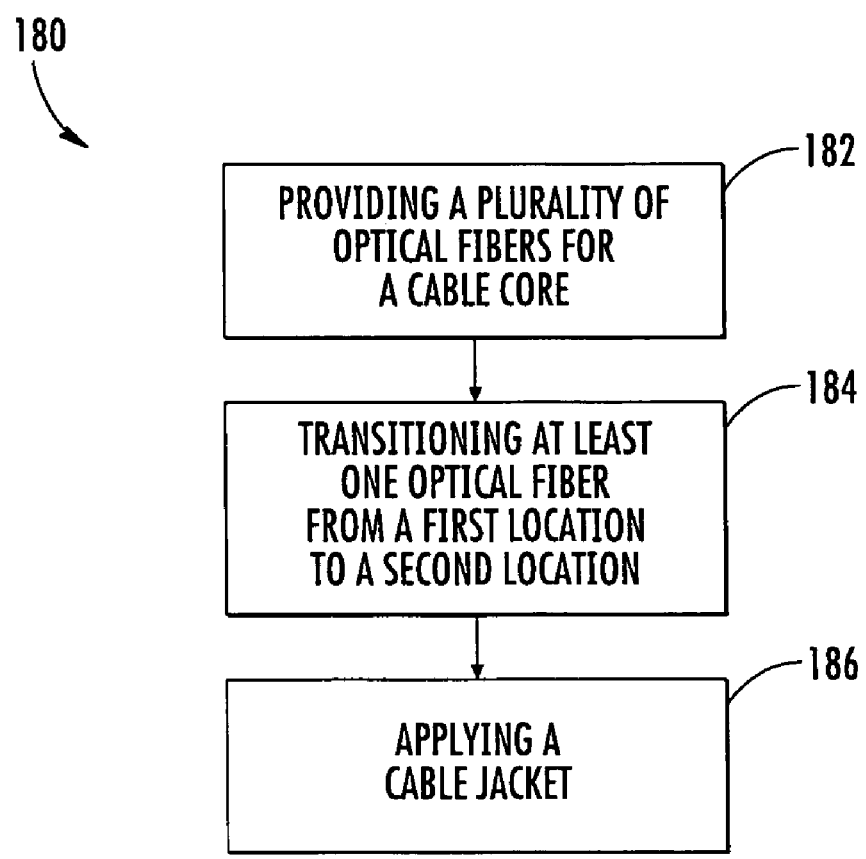
FIG. 18 is a flowchart showing manufacturing steps for distribution cables according to the present invention.

FIG. 18 is a flowchart 180 depicting the manufacturing steps of the present invention; however, other additional steps are also possible. Manufacturing of a loose tube cable is discussed below in relation to the steps of flowchart 180; however, any suitable cable configuration is possible. First, a step 182 of providing a plurality of optical fibers for the cable core is performed. Thereafter, a step 184 is performed where at least one optical fiber is transitioned from a first location to a second location. Finally, a step 186 of applying a cable jacket is performed.

In the case of the loose tube cable, the optical fibers are provided in respective tubes that are stranded together as a portion of the cable core. During stranding of the respective tubes, one or more tubes make the transition from the first location to the second location, thereby creating the desired access locations along the cable. Likewise, a tube from one or more access locations may be transitioned into the cable cable core. The transition of the tube that becomes the access tube may be made by stopping the stranding process and manually rearranging the tubes, introducing a filling component into the cable core and transitioning the tube apart from the cable core, pushing a tube or filling component into the cable core so that another tube is pushed out, or in other suitable ways. Of course, the stranding equipment can be automated so that it makes the transition without the need to stop the stranding process. Then on a separate manufacturing line the cable jacket for the loose tube cable is applied. In this case, the cable jacket is extruded about the stranded cable core having at least one access optical fiber so that it is disposed within an unbreached cable jacket. Separate stranding and jacketing lines are typically used for loose tube cable manufacturing because higher line speeds are possible for the jacketing line compared with the stranding line and using two lines generally results in higher manufacturing yield rates. Of course, distribution cables may be manufactured using a single manufacturing line. Additionally, other cable designs may use other equipment and/or techniques to assemble the cable core in transitioning one or more optical fibers before jacketing of the cable core.

Figure 9:
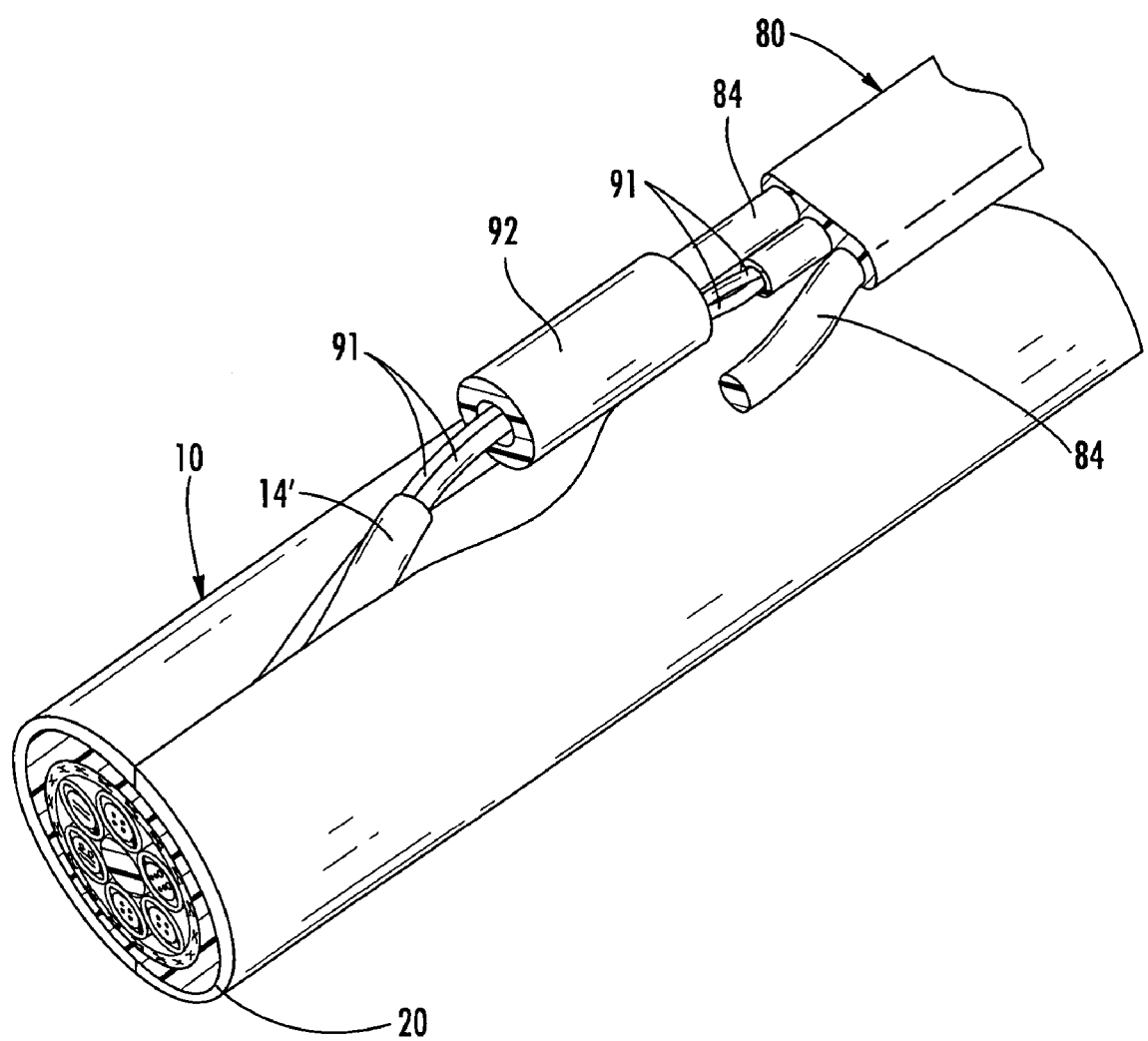
FIG. 9 is a partial assembly view showing the fiber optic tether cable of FIG. 8a being optically connected with the distribution cable of FIG. 2.

Furthermore, during manufacture of the distribution cable any suitable cable component may be provided such as a grease or gel, one or more water-blocking components, one or more strength members or strength components, one or more access location ripcords, filler components, an armor layer, one or more binders, fiber optic carriers, or any other suitable components. Furthermore, methods of constructing a distribution cable assembly by opening the cable jacket after manufacture are also disclosed. By way of example, a partial distribution cable assembly having a tether fiber optic cable is shown in FIG. 9.

Figure 3:
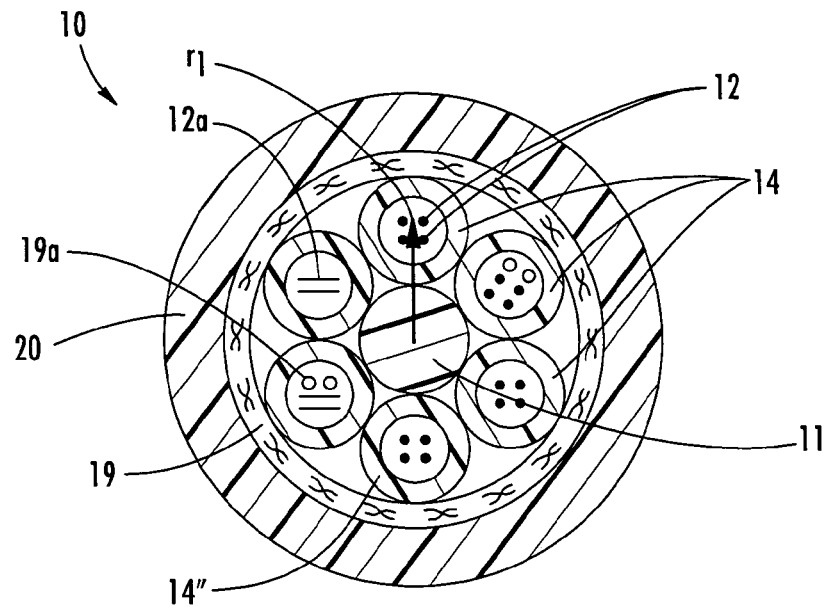
FIG. 3 is a cross-sectional view of the distribution fiber optic cable of FIG. 2 taken along line 3—3.

Next, cable 10 of FIG. 2 will be discussed using FIGS. 3–6 which depict various cross-sectional views of taken along cable 10. FIG. 3 depicts a cross-sectional view of cable 10 taken along line 3—3 showing the cable core having the entire plurality of tubes 14 stranded about central member 11 with a water-swellable component 19 therearound and bound together by cable core binder 16 (not visible), thereby forming the cable core at this location of cable 10. In other words, at this location of cable 10 all of the tubes 14 are disposed within the cable core in FIG. 3. In this embodiment, the cable core is defined by the stranded group of tubes 14 about central member 11; however, other configurations and/or arrangements are possible according to the present invention.

Figure 4:
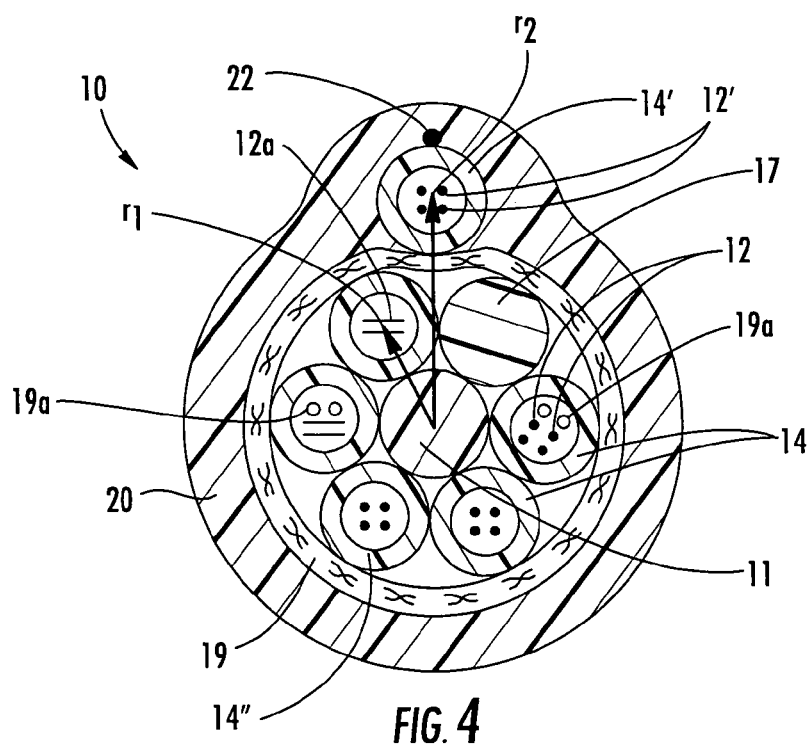
FIG. 4 is a cross-sectional view of the distribution fiber optic cable of FIG. 2 taken along line 4—4 with the addition of the cable jacket.

As shown in FIGS. 2 and 3–6, cable 10 includes at least one access location 18 where at least one optical fiber 12 transitions from a first location $r_1$ within the cable core to a location $r_2$ apart from the cable core as best shown in FIG. 4, thereby providing a predetermined access location 18 in cable 10. In this case, cable 10 depicts a plurality of optical fibers disposed within access tube 14'. Generally speaking, cable may have one or more predetermined optical fibers or optical fiber carriers transition into and/or out of the cable core. After transitioning out of the cable core tube 14 becomes an access tube 14' along the access location. As shown by the cross-sectional view of FIG. 3 taken at line 3—3, tube 14 is a portion of the cable core located at first location $r_1$ for a portion of cable 10. Thereafter, as shown by FIG. 4 tube 14 transitions to a second location $r_2$ that is located at access location 18 apart from the cable core. Simply stated, access tube 14' is no longer stranded with the other tubes 14 or filler component(s) that form the cable core. Consequently, the craftsman does not have to breach the cable core to reach the desired optical fiber; rather, the craftsman may conveniently open the cable jacket and access tube 14' with access optical fibers 12' therein is disposed apart from the cable core.

Stated another way, access tube 14' and access optical fibers 12' of cable 10 are disposed apart from the cable core and are dedicated to the predetermined access location 18. Dedicated means that access optical fibers 12' within the respective access tube 14' ends within access location 18. In this embodiment, access tube 14' and the access optical fibers 12' therein continue for a predetermined distance such as about 15 inches along the access location before ending. Of course, other suitable lengths for access tube 14' and/or access optical fibers 12' are possible along with other variations and other cable designs that route at least one optical fiber apart from the cable core, thereby providing an access optical fiber to at least one access location. For instance, the access tube or the access optical fiber can extend for as much as 30 meters or more before ending.

Other variations of the present invention include having more than one access tube and/or access optical fiber groups at a given access location and/or having several access locations along the length of the cable. Illustratively, FIG. 2f is a schematic representation depicting a plurality of optical fibers or optical fiber carriers as solid lines and, for instance, filler components as dashed lines between cable ends. As shown, optical fibers A–D and F run less than the entire length of the cable and in this case are dedicated at the respective access locations 18, which may vary in length. The transition to an access optical fiber or access optical fiber carrier occurs where the solid line representation moves to the top of the respective starting point of the filler component dashed line representation. In other words, the starting point of the dashed line is where the filler component is introduced into the cable. As also depicted by FIG. 2f, the respective filler components and/or access locations may be in the cable at the same time over any suitable distance such as access locations D and F. Additionally, representation E acts as an express optical fiber or optical fiber carrier that runs the length of the cable so that the optical fibers therein are always within the cable core. Another way of accomplishing express tubes is using two or more layers of tubes with the inner layer of tubes being express tubes.

Generally speaking, cables intended for access in factory applications will have access locations with relatively shorter lengths since a site survey will most likely have been conducted and the distribution cable constructed is tailored for the particular network portion. On the other hand, cables intended for access in field applications generally have relatively longer access locations for aiding installation and/or making adjustments in the field. By way of example, the access location accuracy along the length of the cable for factory applications is about ±3 meters, more preferably about ±1 meters, and most preferably about ±0.2 meters. Whereas the access location accuracy for field applications is about ±30 meters, more preferably about ±10 meters, and most preferably about ±5 meters. Additionally, with access locations having longer lengths of access tubes or access optical fibers it may be desirable to strand the same about the cable core, thereby reducing the preferential bending characteristics of the distribution cable and preserving the optical performance of access optical fiber(s).

In other embodiments, the access optical fibers or access optical fiber carriers can have a uniform cable length between transitions so that access locations are predictable and/or at least one access location or access fiber is available in the cable. For instance, FIG. 2e schematically depicts transitions occurring at a predetermined distances such as every 100 meters along a cable so that at least one access fiber is available; however, cables may have any suitable uniform length between transitions of access optical fibers.

Figure 5:
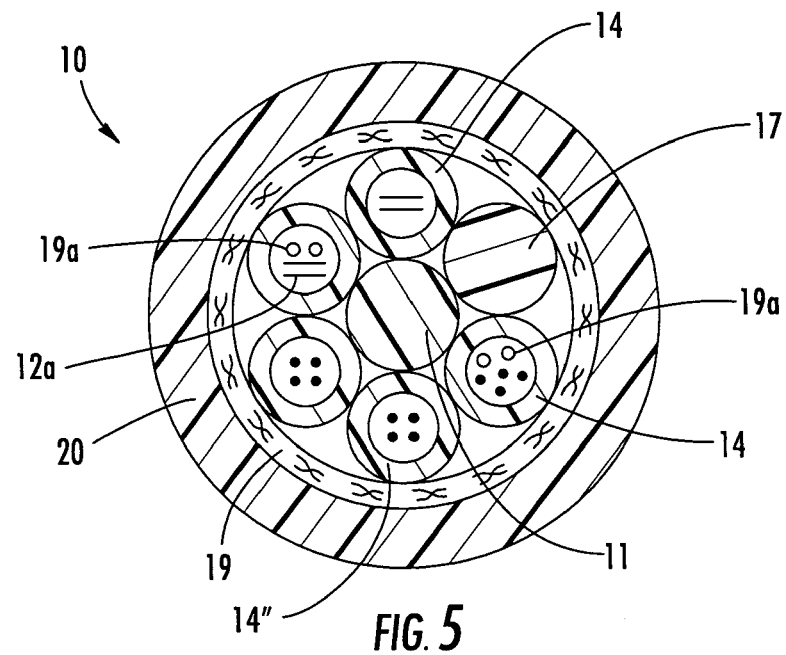
FIG. 5 a cross-sectional view of the distribution fiber optic cable of FIG. 2 taken along line 5—5.

As best shown in FIGS. 2 and 4, filler component 17 is introduced into the cable core near access location 18, thereby taking the position of tube 14 that leaves the cable core and becomes access tube 14'. Consequently, after access location 18 where access tube 14' protrudes, cable 10 maintains a round shape because filler component 17 is disposed within the cable core. FIG. 5 is a cross-sectional view depicting cable 10 after access tube 14' is ended with filler component 17 disposed within the cable core. Filler component 17 is preferably sized so that its outer diameter approximately matches the outer diameter of tube 14 so that the cable diameter remains uniform along the length of the cable. Any suitable materials are possible for use as a filler component such as a thermoplastic rod, tube, or the like. Likewise, more than one filler component can be introduced into the cable core such as when the cable has multiple access locations 18 along its length. In this case, the filler components 17 would have different lengths that correspond with the placement of the respective access locations along the cable.

In this embodiment, the access tube 14' is easily visible along the longitudinal length of cable 10 as a protrusion because the extrusion of the jacket used a tube-on process. Other extrusion techniques such as pressure extrusion are possible, but it may be more difficult to see the access optical fiber using this extrusion process. Of course, other suitable ways of identifying the access location are possible such as a marking indicia like printing or striping disposed on a portion of the cable. Likewise, the marking indicia can reflect the particular access tube or access optical fiber disposed at the access location. When the access tube 14' ends the cable returns to its original round shape since the respective filler component 17 takes the position previously occupied by the tube. Thus, a craftsman can easily locate access location 18 and the cable still maintains a relatively uniform cross-sectional shape. However, other embodiments according to the features of the present invention can eliminate the introduction of the filler component and, for instance, allow the cable core to drop stranded tube positions so there are fewer fiber optic carriers in the cable core or fill the vacated tube position with the cable jacket material.

By way of example, a loose tube cable can be manufactured from the downstream end to the upstream end by starting the stranding process with the cable core having one or more of filler components that are paid-off and stranded about the central member. As an example, consider a cable core that has filling components in each position at its downstream end. As shown in FIG. 2g, at predetermined length locations along the cable near where an access location is desired one or more of the filler components is ended and attached to a respective tube having at least one optical fiber therein (not visible), thereby creating a respective interface I therebetween. Filler components 17 and tubes 14 or other suitable fiber optical carriers may be attached using any suitable method such as an adhesive, welding, or melting them together. Starting at the downstream end, the cable core of filling-components are stranded as typically done during manufacture. FIG. 2g schematically shows a portion of the stranding operation where the first interface between the respective filler component and respective tube arrives at the appropriate place in the manufacturing line such as before a cable core binder is applied. As shown, the interface between the filler component and tube is cut using an appropriate method, thereby allowing the tube 14 to be pulled forward along the stranding line as shown by the arrow in FIG. 2h apart from the cable core, thereby creating the dedicated access tube 14' at that access location. Consequently, the tube overlaps a portion of the filling component it was cut from for creating the access tube similarly as shown in FIG. 2. Additionally, the cutting of the interface can occur with the line running or stopped. Then the stranding resumes until the next interface is reached and the cutting and pulling the tube forward process can be repeated. After stranding is finished the assembly moves to the jacketing manufacturing line. Furthermore, several cables can be manufactured serially during the manufacturing process and cut to length after jacketing.

One advantageous distribution cable according to the features of the present invention eliminates the filler component, but the features can be used with other cable designs as well. By way of example, FIG. 2b shows a distribution cable 10" having n+1 optical fibers, groups of optical fibers, or optical fiber carriers represented by the letters A–G. FIGS. 2c and 2d depict cross-sectional representations of distribution cable 10" respectively taken along line 2c—2c and line 2d—2d showing the relative positions of optical fibers A–G at different locations along the length of distribution cable 10". As shown in FIG. 2c, n of the optical fibers (B–G) are disposed within the cable core and the +1 optical fiber (A) is an access optical fiber that is disposed apart from the cable core. Thereafter, optical fiber A transitions to become a portion of the cable core and optical fiber B becomes the +1 access optical fiber that is disposed apart from the cable core. Additionally, optical fiber A or its representation may be presented outside of the cable core multiple times as shown by FIG. 2b.

By way of example, the cable of FIG. 2b has six (6) optical fiber carriers, i.e., tubes, within the cable core and one (1) optical fiber carrier as an access optical fiber carrier without a filler component being introduced into the cable core. Tube A would become an access tube at multiple location and tube B would become an access tube between the tube A access locations. Likewise, any suitable shuffle among the tubes A–G is possible. Moreover, this embodiment is advantageous because a tube or its representation can present an access optical fiber at several points along the length of the cable and/or at regular intervals. Likewise, n+m embodiments are possible where there are n optical fiber carriers within the cable core and m access optical fiber carriers, where m is multiple access optical fiber carriers that are access optical fiber carriers at several points and/or at regular intervals. Of course, the representations A–G can represent any suitable optical fiber, optical fiber carrier, group of optical fibers, or the like.

Figure 6:
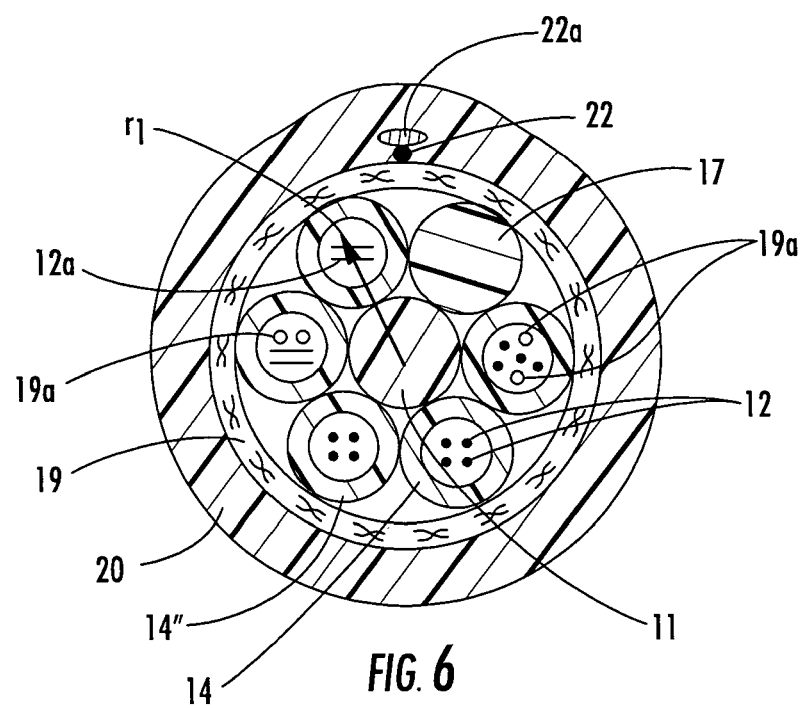
FIG. 6 is a cross-sectional view of the distribution fiber optic cable of FIG. 2 showing the locator portion that is attached to the ripcord.

Furthermore, embodiments of the present invention can further include an access location ripcord 22 that extends over at least a portion of the access location 18 as best shown in FIGS. 2, 4 and 6. In other words, access location ripcord 22 is introduced and attached to a portion of cable 10 during the stranding process. Preferably, access location ripcord 22 is located an appreciable distance upstream from the access location so that it does not slip from the cable without ripping the cable jacket. For instance, access location ripcord 22 can extend for a length of about 5 meters, but other suitable longer and/or shorter lengths are possible depending on the length of the access location.

Using access location ripcord 22 allows for the localized tearing of cable jacket 20, thereby quickly and easily providing access and/or exposing the at least one access tube 14' or access optical fiber within cable 10. In other advantageous embodiments, a locator portion 22a is attached to access location ripcord 22 near an end of the ripcord and forms a noticeable bulge or protrusion in cable jacket 20 as shown in FIG. 6 for locating the end of access location ripcord 22. In this case, locator portion 22a is a metal tab, but other suitable locator portion materials are possible. If locator portion 22a is metallic it can be magnetically detectable within the cable, but locator portions 22a may also be dielectric.

With locator portion 22a the craftsman can quickly locate access location ripcord 22 for ripping cable jacket 20 to provide access. Still further, the craftsman can quickly locate and grab locator portion 22a with an appropriate tool such as a pliers and pull the ripcord through cable jacket 20, thereby quickly and easily providing access and/or exposing the at least one access tube 14' or access optical fiber within cable 10. Since a utility blade is not used, the risk of damage during the access procedure is significantly reduced along with the possibility of injury to the craftsman. In other embodiments, access location ripcord 22 is attached to access tube 14' or the access optical fiber using a tape or other suitable adhesive material so that when pulled the cable jacket rips near the access tube 14' or access optical fiber. In other embodiments, the end of access location ripcord is attached to access tube 14' by disposing the same within a slit in the end of access tube 14'. Other embodiments for holding and positioning access location ripcords are possible as discussed below.

FIG. 2a illustrates a cable 10' that is similar to cable 10, except it further includes a ferrule 25 and/or optical connector attached to at least one of the access optical fibers 12'. The ferrule and/or connector is any suitable design such as MT, MTP, MT-RJ, SC, SCA, FC, DC, LC, or the like. In this case, a multi-fiber ferrule 25 is shown for making several optical connections when mated with an appropriate counterpart. In other embodiments, single-fiber ferrules or connectors may be attached to individual access optical fibers, thereby allowing individual optical connectivity for the access optical fibers. At any rate, attaching a ferrule or optical connector to the access optical fiber allows for quick and easy mating in the factory or field. Additionally, a protective sleeve or cover (not shown) may be placed about the ferrule or connector for protecting the same until the jacket is breached for connectivity. If a ferrule is used the remaining components of the connector may be attached after opening the cable jacket.

Furthermore, distribution cables according to the present invention can have other structures for protecting the access tube or access optical fiber while still permitting quick and easy access to the same. By way of example, a craftsman may use a utility knife for entering the access location. Illustratively, FIGS. 6a and 6b depict other structures for protecting the access tube or access optical fiber. Specifically, FIG. 6a depicts a portion of a distribution cable 60 having protective members 62 located on opposite sides of access tube 14' that are preferably larger than access tube 14' so that a utility knife is able to run along protective members 62 without cutting access tube 14'. Of course, other embodiments can have protective members or different shapes and/or sizes. Protective members 62 are formed from any suitable material such as a GRP or metal wire. FIG. 6b depicts a portion of a distribution cable 64 that has access tube 14' enclosed in a protective casing 66 so that the utility knife can cut into the protective casing 66 without worry of damaging access tube 14'. Additionally, protective casing 66 provides crush resistance for the access optical fiber. Likewise, similar protective structure as shown in FIGS. 6a and 6b may be used with other distribution cables of the present invention as well as other protective structures.

Cable 10 includes cable core binder 16 and a second binder 16a for holding the cable core together. Additionally, second binder 16a. may also hold the access location ripcord 22 in position. Specifically, cable core binder 16 and second binder 16a are wound counter-helically in cable 10 and are preferably made from different materials to influence, for instance, tear properties. Cable core binder 16 is wrapped in a first direction and is formed from a polyester material having a relatively high tensile strength and tear resistance. On the other hand, second binder 16a is wrapped on top of cable core binder 16 in a second direction and is formed from a second material having a lower tear resistance compared with cable core binder 16 and a relatively low tensile strength. Of course, other suitable binder configurations are possible. When access tube 14' is transitioned from the first location $r_1$ to the second location $r_2$ it is routed past cable core binder 16 and lays radially outward of the same, but access tube 14' is held in place by second binder 16a to maintain its position. Cable 10 locates access location ripcord 22 between cable core binder 16 and second binder 16a. Consequently, when access location ripcord 22 is pulled through cable jacket 20 it also easily tears second binder 16a so access tube 14' can be easily pulled away from the cable core.

Other variations, combinations, and/or arrangements of binders, ripcords and/or other components are possible. For instance, cables may use a single ripcord, multiple ripcords, vary placement and spacing of the ripcord(s), and use different materials. Additionally, cable 10 can have numerous variations, combinations, and/or arrangements of water-swellable components such as within the cable core or out of the cable core. Still further, tubes may have any suitable type of water-blocking components therein such as one or more water-swellable components or a filling material such as grease or gel. Likewise, the cable may use a foam having a water-swellable layer (FIG. 13).

The remaining tubes 14 within the cable core can become access tubes in a similar manner along cable 10 or the other tubes can act as express tubes 14" as shown in FIG. 4 that remain in the cable core along the entire length of the cable. Consequently, a service provider can provide information regarding the desired access locations, number of fibers desired at a given access location, if any express fibers are desired, etc. from a site survey and a cable can be advantageously manufactured for the specific portion of the optical network. Thus, the present invention eliminates the need for the craftsman to perform a conventional mid-span access into the cable core to access the desired optical fiber(s). Moreover, the access location(s) provided by the present invention not only saves time during connectivity procedures but greatly reduce the risk of damage to the optical fibers compared with a conventional mid-span access procedure that requires breaching the cable core.

Central member 11 of FIG. 2 acts as a suitable strength member and is sized for stranding the plurality of tubes 14 therearound. As shown, central member 11 is a glass-reinforced plastic (GRP), but other suitable materials are possible for central members such as steel or other dielectric materials. Additionally, it is also possible to upcoat the central member to a predetermined dimension with a polymer material so that the desired number of tubes will fit about the same. Other embodiments of the present invention could eliminate central member 11 such as a cable having three stranded tubes or a monotube cable construction with different types and/or locations for strength members. Also a water-blocking or a water-swellable component(s) can be included about the central member for inhibiting the migration of water in the middle of the cable. For instance, one or more water-swellable yarns and/or tapes can be wrapped about central member 11. Cables can also include a flooding compound outside of tubes 14 or a filling compound within tube 14 for blocking the migration of water along the cable. As depicted in cable 10, one or more tubes 14 may include a water-swellable thread or yarn 19a therein for water-blocking within the tube.

Cable 10 includes optical waveguides such as loose optical fibers 12 and ribbonized optical fibers 12a disposed in respective tubes 14, but one or more optical waveguides 12 may have other suitable optical fiber carriers such as tight-buffered or bundles. Additionally, other types or configurations of optical waveguides can be used. For example, optical waveguide 12 can be single-mode, multi-mode, pure-mode, erbium doped, polarization-maintaining fiber, or other suitable types of light waveguides. Each optical waveguide 12 may include a silica-based core that is operative to transmit light and is surrounded by a silica-based cladding having a lower index of refraction than the core. Additionally, one or more coatings can be applied to optical fibers. For example, a soft primary coating surrounds the cladding, and a relatively rigid secondary coating surrounds the primary coating. Optical waveguide 12 can also include an identifying means such as ink or other suitable indicia for identification. Suitable optical waveguides 12 are commercially available from Corning Incorporated of Corning, N.Y.

Figures 7A, 7B:
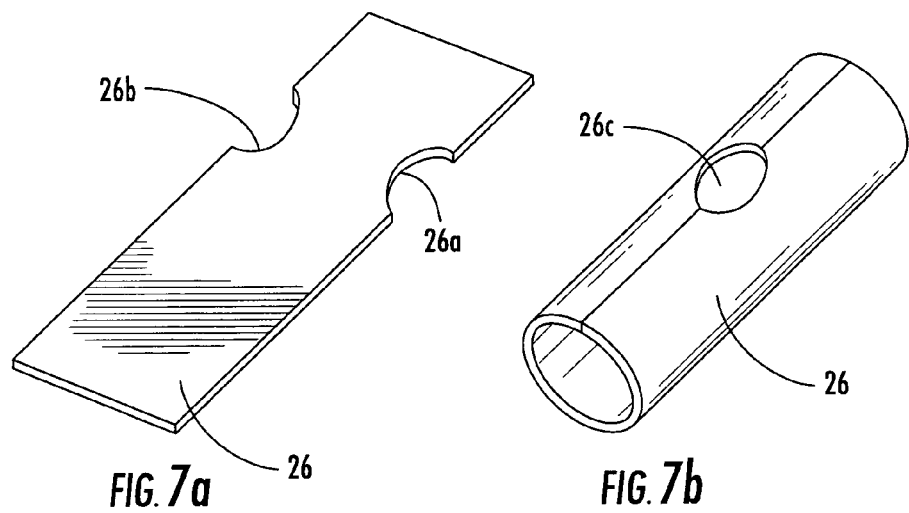
FIGS. 7a–7c depict an armor layer for use with the present invention and a cross-sectional view of a distribution fiber optic cable having an armor layer according to the present invention.
Figure 7C:
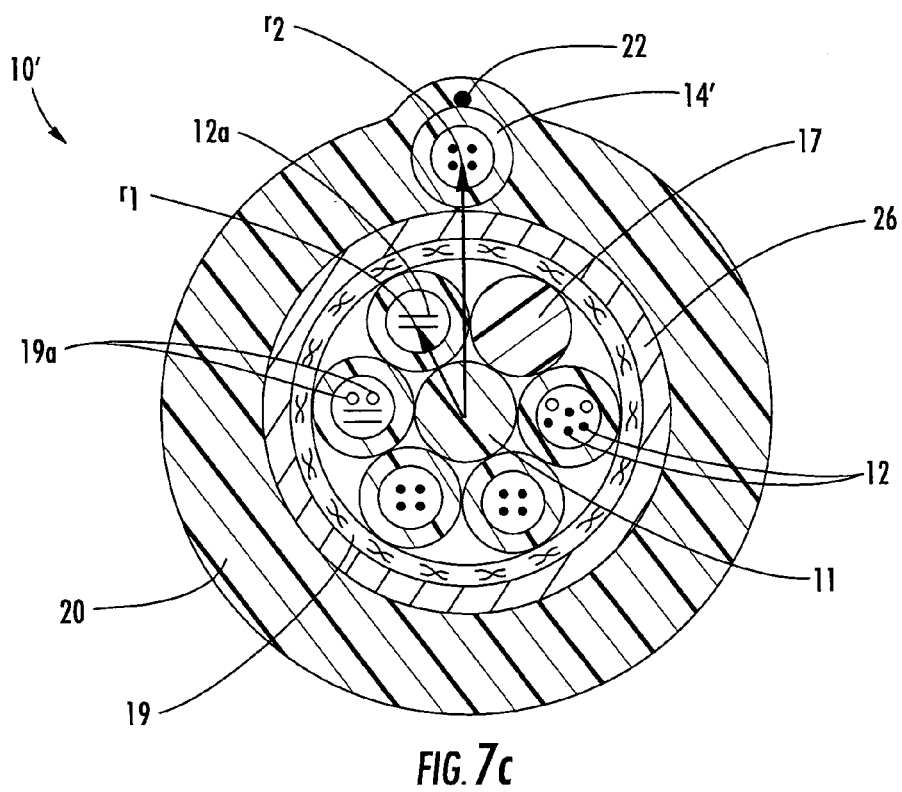
Figure 8A:
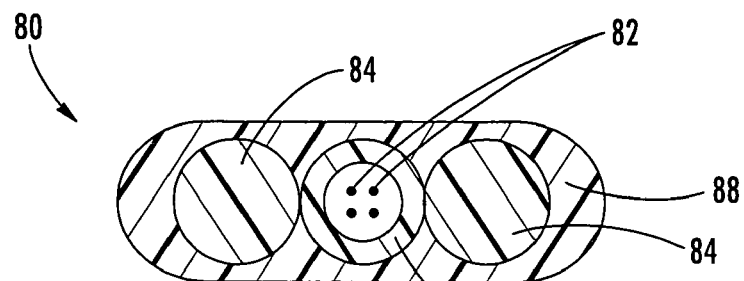
FIGS. 8a–8d depict several different fiber optic tether cables suitable for use with distribution cable of the present invention as a cable assembly.
Figure 8B:
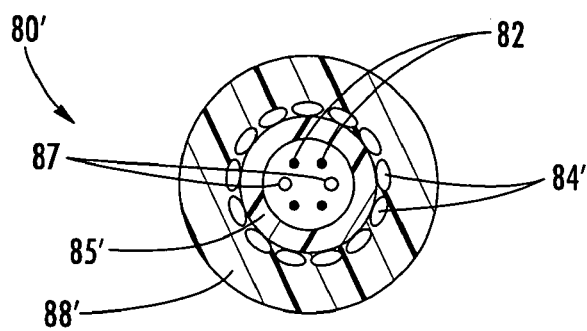
Figure 8C:
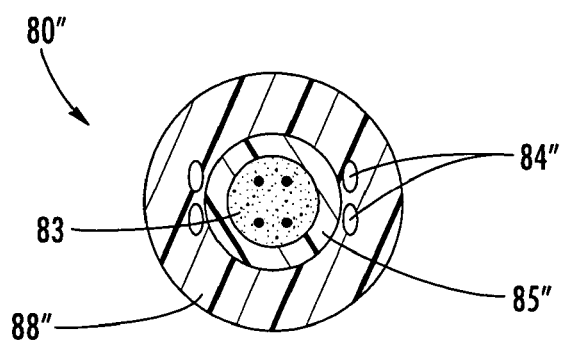
Figure 8D:
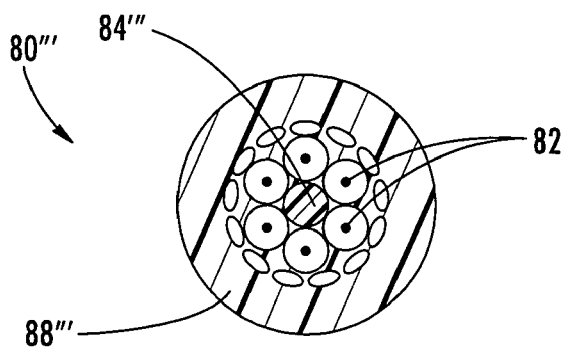

FIGS. 7a and 7b depict an armor layer 26 for use with cables of the present invention. Specifically, FIG. 7a shows an armor layer having notches 26a, 26b before forming and FIG. 7b shows the armor layer 26 after forming where notches 26a, 26b form an opening 26c. Opening 26c of armor 26 is longitudinally located where access tube 14' transitions from the first location $r_1$ to a second location $r_2$ so that access tube 14' and/or access optical fibers can pass radially outward of armor 26. FIG. 7c depicts a cable 10' similar to cable 10, except it includes armor layer 26. Any suitable material such as a metal or dielectric or construction smooth or corrugated is possible for armor layer 26. Of course, if desired other cable designs of the present invention can also include an armor layer. Additionally, other cable variations are possible such as stranded tube cable configuration having two or more layers of tubes or a central tube having the tubes stranded therearound instead of a central member. Also, instead of housing the optical fibers in tubes, the optical fibers may be disposed in respective protective sheaths that are easily openable for accessing the optical fibers. Also any suitable stranding may be used in the cable constructions disclosed herein.

Additionally, cable 10 or 10' or any other cable of the present invention can include a suitable fiber optic tether cable (hereinafter tether cable) that is optically connected to at least one optical fiber at the access location. Likewise, the distribution cable can have more than one tether cable at one or more access locations. FIGS. 8a–8d depict explanatory tether cables for use with the concepts of the present invention; however, other suitable tether cables are possible. Tether cables such as cables 80, 80', 80", 80''' preferably include one or more optical fibers 82, one or more strength members or strength components 84, 84', 84", 84''' for carrying a tensile load and providing anti-buckling, and a cable jacket 88, 88', 88", 88''' for environmental protection. For instance, a water-blocking grease or gel 83, a water-swellable yarn or thread 87, or water-swellable coating (not visible) may be used for blocking the migration of water along the tether cable. Tether cables have different profiles such as round or flat and can include other suitable cable components. The tether cables shown have tubes 85, 85', 85"; however, tubeless designs are also possible. Likewise, other suitable cable components are possible as known in the art.

One or more optical fibers 82 of the tether cable are optically connected with access optical fibers (not visible) of access tube 14' or other access optical fibers of the distribution cable. Typically, access optical fibers and the optical fibers of the tether cable will include a protective tubing or casing and the splice between the optical fibers will be protected from stress as known. Additionally, the strength members or strength components of the tether cable are strain relieved to inhibit the application of tensile forces to the optical fibers.

FIG. 9 depicts a partial assembly of tether cable 80 being optically connected with cable 10 of FIG. 2. Specifically, FIG. 9 shows a portion cable jacket 20 that was ripped open for exposing access tube 14' and the access optical fibers therein. Specifically, ripcord 22 of cable 10 is pulled so that the desired portion of cable jacket 20 is opened, thereby allowing access tube 14' to be pulled out as shown. Thereafter, a protective casing or furcation tubing 91 is slid over the respective access optical fibers (not visible) disposed in access tube 14' for protecting the same. Likewise, respective protective casings are slid over the exposed optical fibers of tether cable 80. Respective optical splices are made between optical fibers of tether cable 80 and cable 10 and the splices are disposed in a protective housing 92. Protective housing 92 and/or tether cable 80 can be attached to cable 10 using, for instance, an adhesive tape. Thereafter, an environmental cover (not shown) is placed over the access location and a portion of tether cable 80. The environmental cover should attach to the strength components or strength members 84 to provide adequate strain relief. Typical environmental covers-can include closures or overmolding with a suitable compound. The depicted embodiment of the tether cable optically connected with the distribution cable is explanatory and other different configurations and arrangements are possible within the concepts of the present invention.

Figure 10:
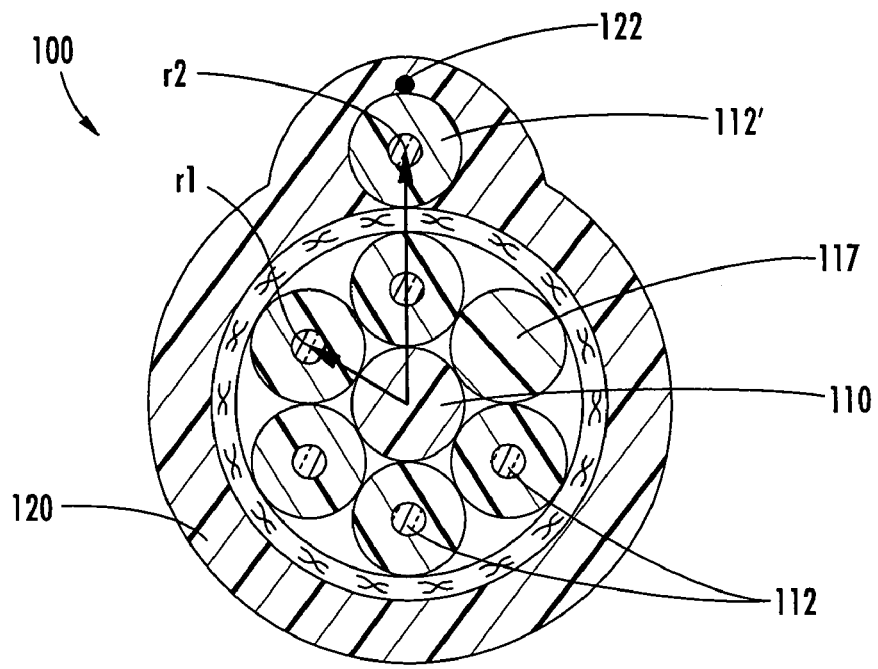
FIG. 10 depicts another fiber optic distribution cable according to the present invention.

FIG. 10 depicts another fiber optic cable configuration according to the concepts of the present invention. Specifically, FIG. 10 depicts a distribution cable 100 having optical fibers 112 that tight-buffered and stranded along the length of the cable. Any suitable material may be used for the tight-buffer layer such as a polymer or a UV curable material. Cable 100 also includes a central member 110, at least one cable core binder 116 (not visible), at least one filler component 117, at least one access location 118 (not numbered), and a cable jacket 120. Cable 100 employs concepts similar to cable 10 since it includes at least one access location 118 where at least one optical fiber 112 transitions from a first location $r_1$ within the cable core to a second location $r_2$ apart from the cable core as shown, thereby providing a predetermined access location in cable 100 at access location 118. Moreover, a given optical fiber 112 becomes an access optical fiber 112' after it transitions from the first location $r_1$ within the cable core to a second location $r_2$ disposed apart from the cable core. Consequently, the craftsman does not have to breach the cable core to access the desired access optical fiber 112' disposed within access location 118.

Like cable 10, the access optical fibers 112' of cable 100 can continue for a predetermined distance and then may be terminated. Of course, any suitable lengths for access optical fibers 112' are possible along with other cable variations that route at least one optical fiber apart from the cable core, thereby providing an access location. Other variations of cable 100 include eliminating the central member, having more than one access optical fiber at a given access location, and/or having several access location along the length of the cable. This particular design may be advantageous in architectures where only one optical fiber is required at the access location such as multiple-dwelling units or distributive splitting architectures.

Filler component 117 of cable 100 is introduced into the cable core near access location 118 as discussed previously, thereby taking the position of optical fiber 112 that leaves the cable core and becoming access optical fiber 112'. Consequently, after access location 118 where access optical fiber 112' protrudes, cable 100 maintains a round shape because filler component 117 is disposed within the cable core. Of course, more than one filler component can be introduced into the cable core such as when the cable has multiple access locations 118 along its length. As before, filler component 117 and access optical fiber 112' preferably overlap for an appreciable distance so that the protrusion of access optical fiber 112' is easily visible along the longitudinal length of cable 100. Again, other suitable ways of identifying the access location are possible such as using a marking indicia. However, other embodiments according to the concepts of cable 100 can eliminate the introduction of the filler component 117 and, for instance, allow the cable core to drop stranded optical fiber positions, fill the vacated optical fiber position with the cable jacket material, or shorten the stranding length to accommodate the vacated tube position.

Likewise, embodiments of cable 100 can further include an access location ripcord 122 that extends over at least a portion of the access location 118 for a suitable length for quickly and easily providing access and/or exposing the at least one access optical fiber 112'. In other advantageous embodiments, a locator portion (not shown) is attached to access location ripcord 122 near an end of the ripcord and forms a noticeable bulge or protrusion in cable jacket 120 for locating the end of access location ripcord 122. Preferably, locator portion is a metal tab, but other suitable locator portions materials are possible such as a dielectric material. Consequently, the craftsman can quickly locate access location ripcord 122 for ripping cable jacket 120 providing access to access optical fiber 112'. In other embodiments, access location ripcord 122 may be attached to access optical fiber 112' using a tape or other suitable adhesive material that tears when ripping the access location ripcord, but in embodiments using a second ripcord it may hold the access location ripcord in position.

Figure 10A:
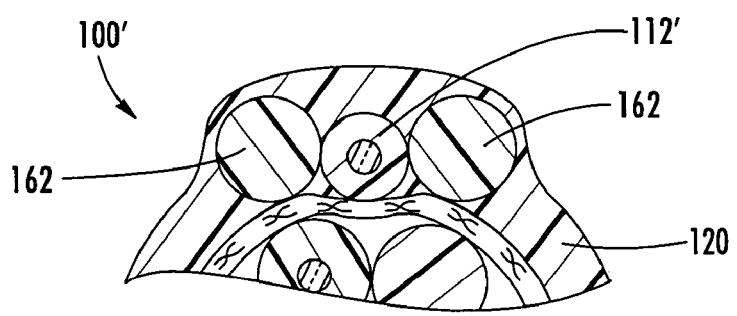
FIGS. 10a and 10b depict portions of the fiber optic distribution cable of FIG. 10 having alternative structures.
Figure 10B:
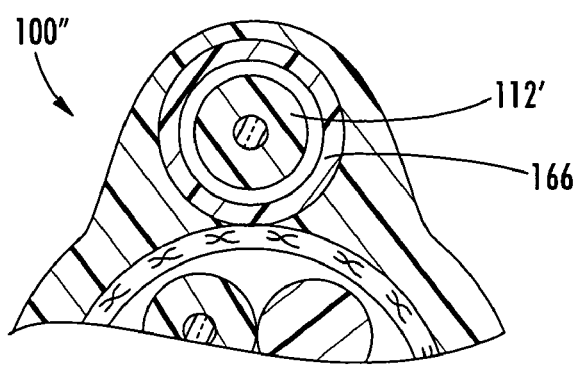

Furthermore, cables configurations similar to cable 100 can have other structures for protecting the access optical fiber while still quickly entering the cable. By way of example, a craftsman may use a utility knife for accessing the access location. FIG. 10a depicts a portion of an alternative distribution cable 100' having protective members 162 on opposite sides of access optical fiber 112' that are preferably larger than access optical fibers 112' so that a utility knife is able to run along protective members 162 without cutting access optical fibers 112'. Protective members 162 are formed from any suitable material such as a grp or metal wires. FIG. 10b depicts a portion of another alternative distribution cable 100" having access optical fiber 112' enclosed in a protective casing 166 so that the utility knife can cut into the protective casing 166 without worry of damaging access optical fiber 112'. No matter the cable design used, the present invention is advantageous because the craftsman can easily locate the access optical fiber 112' by inspecting the jacketed cable for the ridge or marking indicia on the cable. Thereafter, the cable is opened at the access location for accessing the access optical fiber, thereby allowing quick and easy access for connectivity in the factory or field without a conventional and risking mid-span access procedure.

Like cable 10, cable 100 includes at least one cable core binder 116 (not visible) for holding the cable core together if S-Z stranding is used. If optical fiber carriers are merely stranded in one direction the cable core binder is not necessary. Additionally, a second binder 116a (not visible) could be used for holding the access ripcord in position. Specifically, cable core binder 116 and second binder 116a are wound counter-helically in cable 100 and the binders are preferably made from different materials having different material characteristics. Additionally, access location ripcord 122 is disposed between cable core binder 116 and second binder 116a. Consequently, when access location ripcord 122 is pulled through cable jacket 120 it also tears second binder 116a so access optical fiber 112' is not bound. However, cable 100 can have numerous variations as discussed herein.

Likewise, the remaining optical fibers 112 within the cable core can become access optical fibers at access locations in a similar manner along cable 100. Although central member 111 is illustrated it is not required. Cable 100 could also include one or more water-blocking or water-swellable component(s).

Figure 11:
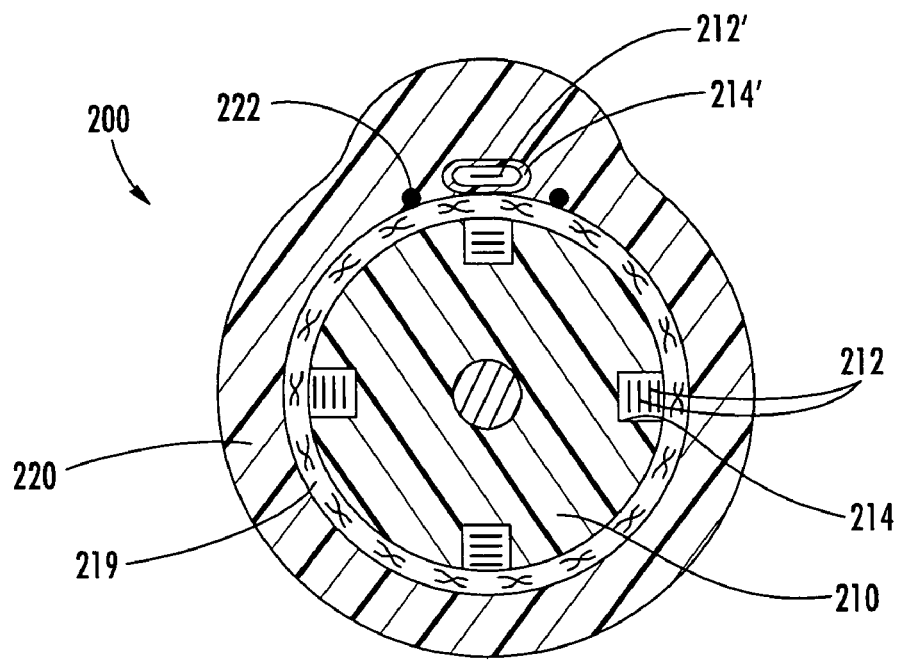
FIGS. 11–13 depict other fiber optic distribution cables according to the present invention.

Other cable configurations according to the concepts of the invention can strand the optical fibers within the cable. For instance, FIG. 11 depicts a distribution cable 200 having a slotted core construction including a plurality of optical fibers 212 that are disposed within a plurality of helical slots 214 of slotted core 210. Cable 200 employs concepts similar to cable 10 since it includes at least one access location 218 (not numbered) where at least one optical fiber 212 transitions from the first location $r_1$ within the cable core to the second location $r_2$ apart from the cable core as shown, thereby providing a predetermined access location in cable 200. Moreover, a given optical fiber 212 becomes an access optical fiber 212' after it transitions from the first location $r_1$ within the cable core to the second location $r_2$ that is located apart from the cable core. In other words, the access optical fiber is a portion or subset of a plurality of access optical fibers within the access optical fiber ribbon.

In this case, the plurality of optical fibers 212 are ribbons that are inserted in the helical slots 214 so that they are stranded about the middle of cable 200. Cable 200 also includes at least one water-swellable component 219 in the cable core, specifically, cable 200 includes a water-swellable tape wrapped about slotted core 210, thereby forming the cable core. The water-swellable tape is secured by at least one cable core binder 216 (not visible) and a cable jacket 220 is extruded thereover. Consequently, the craftsman does not have to breach the cable core to access the desired access optical fiber 212' disposed within access location 218. Other variations of cable 200 include having more than one access optical fiber at a given access location and/or having several access locations along the length of the cable.

Because cable 200 is a slotted core configuration it does not require a filler component for taking the position of optical fiber or tube that leaves the cable core and becomes access optical fiber or access tube. Consequently, cable 200 may somewhat simplify the manufacturing complexity in producing access location 218. Again, other suitable ways of identifying the access location are possible such as creating a protrusion in the cable profile or using a marking indicia, thereby allowing quick and easy identification and access in the factory or field.

Figure 13A:
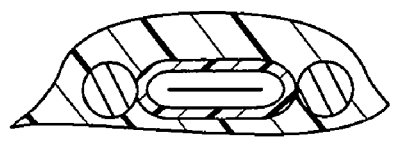
FIGS. 13a and 13b depict portions of other configurations of fiber optic distribution cables that may be used with the cables of FIGS. 11–13.
Figure 13B:
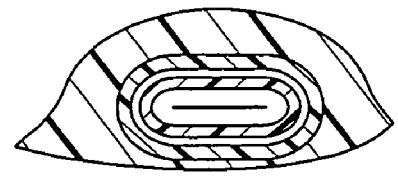

Access optical fibers 212' are configured as a ribbon or a portion thereof and preferably have a sheath 214' shaped to receive and protect the ribbon as shown. Embodiments of cable 200 can further include one or more access location ripcords 222 that extends over at least a portion of the access location 218 for a suitable length for quickly and easily providing access to the at least one access optical fiber 212'. In other advantageous embodiments, a locator portion (not shown) as discussed is attached to the one or more access location ripcords 222 near an end of the ripcord and forms a noticeable bulge or protrusion in cable jacket 220 for locating the end of access location ripcord 222. As shown in FIGS. 13a and 13b, cables configurations similar to cable 200 can have protective member or protective casing structures for protecting the access optical fibers while entering the cable using a utility knife.

As before, cable 200 preferably includes at least one cable core binder 216 (not visible) and a second binder 216a (not visible) for holding the water-swellable tape about slotted core 210. Specifically, cable core binder 216 and second binder 216a are wound counter-helically in cable 200. Additionally, access location ripcord 222 and sheath 214' are disposed between cable core binder 216 and second binder 216a so that when access location ripcord 222 is pulled through cable jacket 220 it also tears second binder 216a so access optical fiber 212' within sheath 214' can be easily pulled away from the cable core. However, cable 200 can have numerous variations as discussed with other cables herein. The remaining optical fibers 212 within the slotted core 210 can become access optical fibers for at access locations in a similar manner along cable 200. Cable 200 could also include other water-blocking or water-swellable component(s).

Other cable configurations according to the concepts of the invention can have optical fibers in a stack of ribbons or bundles of optical fibers in a central cavity or a central tube that is disposed within an inner surface of a cable jacket that forms a longitudinal passageway or cavity. For instance, FIG. 12 depicts a distribution cable 300 with a tubeless construction having a plurality of optical fibers 312 in respective ribbons that are arranged in a ribbon stack. Any suitable type of known ribbon stack is possible such as profiled stack of ribbons. By way of example, profiled stacks generally have larger ribbons with more fibers in the middle-of the stack such as 12-f ribbons, then outboard ribbons having fewer fibers such as 8-f, and may include further outboard ribbons having even fewer fibers such as 4-f, thereby profiling the stack with the inner diameter of the cavity or central tube. Additionally, ribbon preferably have multiples of four optical fibers and may have preferential tear portions for separating into groups of four. However, ribbons may be better suited for access location having relatively short lengths due to their preferential bend characteristic, but ribbons may be used in longer access locations if the preferential bend characteristics are addressed, for example, by stranding the access ribbon.

Cable 300 employs concepts similar to cable 10 since it includes at least one access location (not numbered) where at least one optical fiber in this case an optical fiber ribbon 312 transitions from the first location $r_1$ within the cable core to the second location $r_2$ apart from the cable core as shown, thereby providing a predetermined access location in cable 300 at access location 318. Moreover, a given optical fiber 312 becomes an access optical fiber 312' after it transitions from the first location $r_1$ within the cable core to a second location $r_2$ that is located apart from the cable core. In this case, the plurality of optical fibers 312 are disposed in a ribbon that is a portion of a ribbon stack that may be stranded within cavity 302 of cable 300. Cable 300 also includes at least one water-blocking component 303 in cavity 302, specifically, cable 300 includes a water-blocking gel 303 in the cable core. However, other embodiments can use a water-swellable component such as a compressible foam tape having a water-swellable layer as known in the art. Nonetheless, the craftsman does not have to breach the cable core to access the desired access optical fiber 312' disposed within access location 318. In other words, cable jacket 320 is breached to reach the access optical fibers, but the opening of cable jacket 320 does not require opening cable jacket 320 all the way to cavity 302. Other variations of cable 300 include having more than one access optical fiber at a given access location and/or having several access location along the length of the cable.

Like cable 200, cable 300 does not require a filler component for taking the position of optical fiber or tube that leaves the cable core and becomes access optical fiber. But, cable 300 may be somewhat more difficult to manufacture than other cables of the present invention. One way to ease the manufacture of cable 300 is for all of the optical fiber ribbons to have a respective sheath as shown in FIG. 13. Again, access location is identified in suitable ways such as creating a protrusion in the cable profile or using a marking indicia, thereby allowing quick and easy identification and access in the factory or field.

Access optical fibers 312' preferably have a sheath 314' shaped to receive and protect the ribbon as shown. Embodiments of cable 300 can further include an access location ripcord 322 that extends over at least a portion of the access location 318 for a suitable length for quickly and easily providing access to the at least one access optical fiber 312'. In other advantageous embodiments, a locator portion (not shown) as discussed is attached to access location ripcord 322 near an end of the ripcord and forms a noticeable bulge or protrusion in cable jacket 320 for locating the end of access location ripcord 322 Additionally, cable 300 has a plurality of strength members 321 at least partially disposed within cable jacket 320 that impart a preferential bending characteristic to the cable. Again, as discussed in FIGS. 6a and 6b, cables configurations similar to cable 300 can have protective member or protective casing structures for protecting the access optical fibers while entering the cable using a utility knife.

Cable 300 may have numerous variations as discussed with other cables herein. For instance, the remaining optical fibers 312 within cavity 302 can become access optical fibers at one or more access locations in a similar manner along cable 300. Cable 300 could also include other water-blocking or water-swellable component(s). Additionally, cable jacket may be formed by a co-extrusion process such as in a tubeless cable design so that the cable jacket can be partially opened without breaching the cavity.

FIG. 13 depicts a cable 400 similar to cable 300, except it includes a core tube 404 rather than being a tubeless configuration. A foam tape having a water-swellable layer 406 is used within core tube 404 instead of a water-blocking grease. The foam tape having the water-swellable layer provides, among other things, cushioning, coupling, and water-blocking within core tube 404. This embodiment does not include at least one cable core binder, but variations may use a cable core binder for holding layer 406. Also each ribbon of cable 400 has an individual sheath 414. In this cable, core tube 404 requires an opening (not visible) near the access location (not numbered) like the armor layer of FIGS. 7a and 7b for allowing access optical fibers 412' to transition from the first location $r_1$ within the cable core to a second location $r_2$ located apart from the cable core. Of course, other variations of this cable configuration or any other cable configurations are possible.

Figure 14:
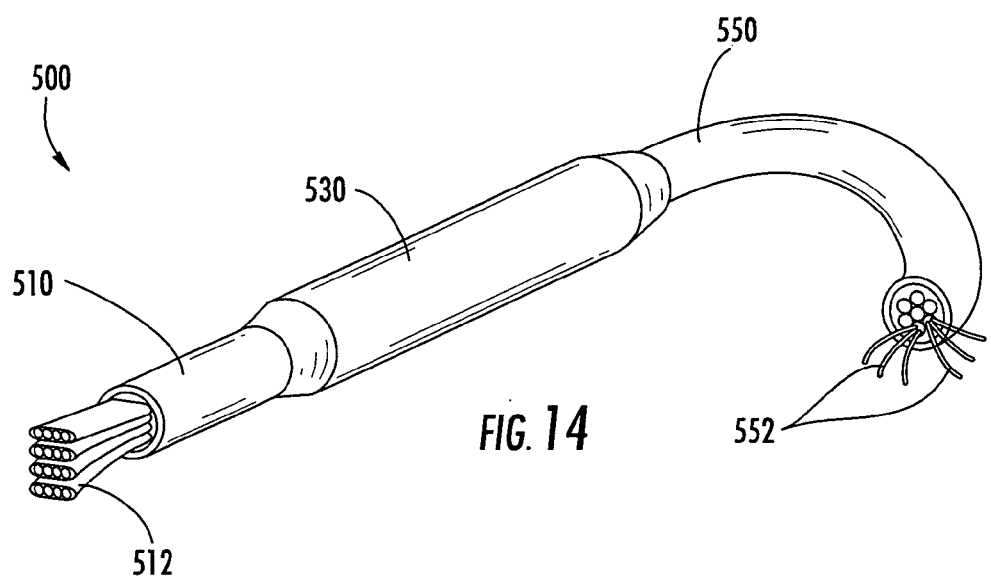
FIG. 14 is a perspective view of a portion of a transition fiber optic cable according to the present invention.

Additionally, the disclosure is also directed to cross-connect fiber optic cables that can be practiced with or without the cables having one or more access locations as disclosed above. FIG. 14 depicts a partial perspective view of a cross-connect fiber optic cable 500 (hereinafter cross-connect cable) having an upstream portion that is a first cable section 510, a cross-connect apparatus 530, and a downstream portion that is a second cable section 550. Cross-connect apparatus 530 is useful for cross-connecting and/or fiber management between the first and second cable sections 510, 530. One advantage of the cross-connect apparatus is that it allows the use of different optical fiber formats in the first and second cable sections such as ribbonized optical fibers upstream and non-ribbonized optical fibers downstream. Additionally, both cable sections could use ribbonized optical fibers, but the ribbons in cable sections are in a different format because the ribbons of the cable sections do not have the same number of fibers and/or configuration. In other words, the formats of optical fibers between the upstream portion and the downstream portion do not match.

Figure 17:
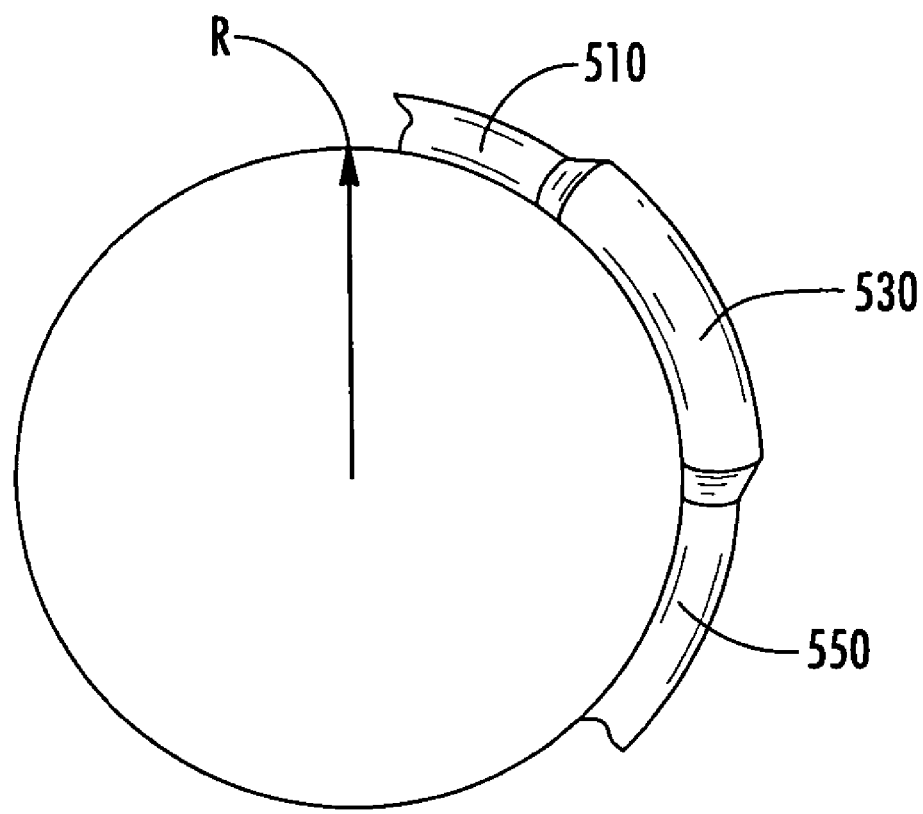
FIG. 17 shows the portion of the cross-connect fiber optic cable of FIG. 14 wound on a cable reel.

Upstream portion and downstream portion are connected by cross-connect apparatus 530 that is sufficiently flexible to allow winding of the cross-connect cable 500 on a cable reel as shown in FIG. 17. For instance, cross-connect apparatus may have a minimum bend radius R of about thirty-six inches or less, more preferably, about twenty-four inches or less and most preferably about eighteen inches or less; however, other suitable configurations can have a smaller or larger minimum bend radius.

Cross-connect cable 500 is advantageous since first cable section 510 includes at least one ribbon 512 that is suitable for mass fusion splicing with another ribbon at, for instance, the central office end of an optical network. Consequently, ribbonization of loose fibers at the head end is not necessary for mass-fusion splicing. Cross-connect cable 500 also advantageously incorporates the flexibility to cross-connect optical connections according to a distribution plan. On the other hand, second cable section 550 of cable 500 includes optical fibers 552 that are non-ribbonized so that individual optical fibers are accessible for connection with specific ribbons in the factory. In other words, cross-connect cable 500 allows a great deal of flexibility in optically connecting different optical fibers 552 of the downstream portion into a predetermined scheme with ribbons 512 of the upstream portion. Cross-connect cable 500 also maintains flexibility in a relatively small footprint, thereby allowing winding of the cross-connect cable onto a cable reel and relatively easy installation.

Figure 15:
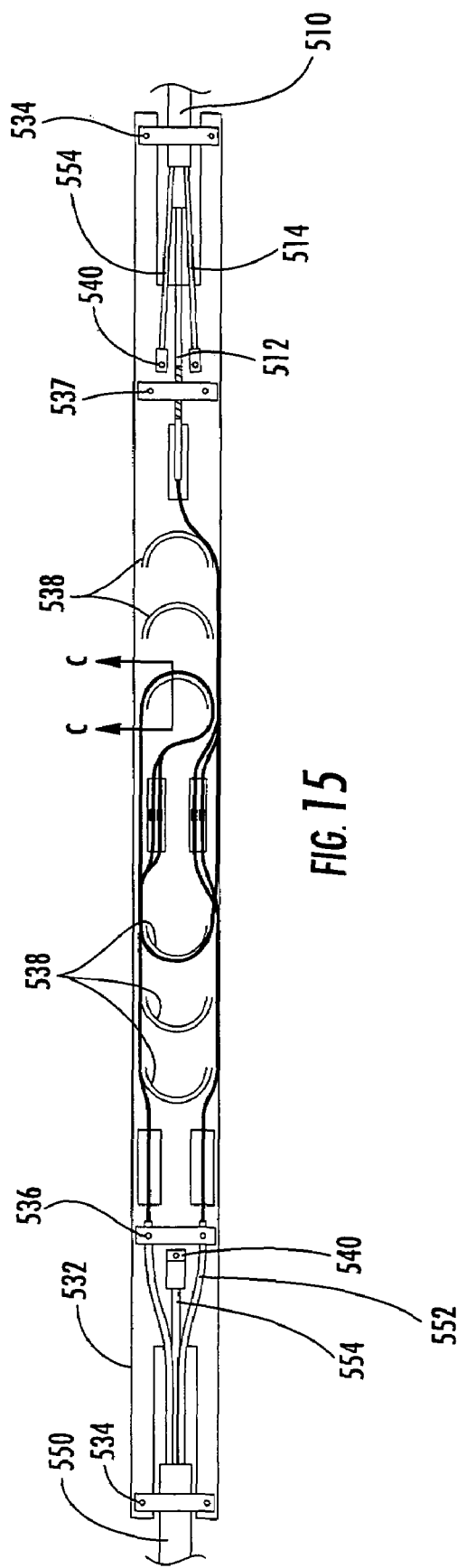
FIGS. 15 and 16 respectively depict a plan view and a side view of a portion of cross-connect apparatus with the cover removed.
Figure 16:
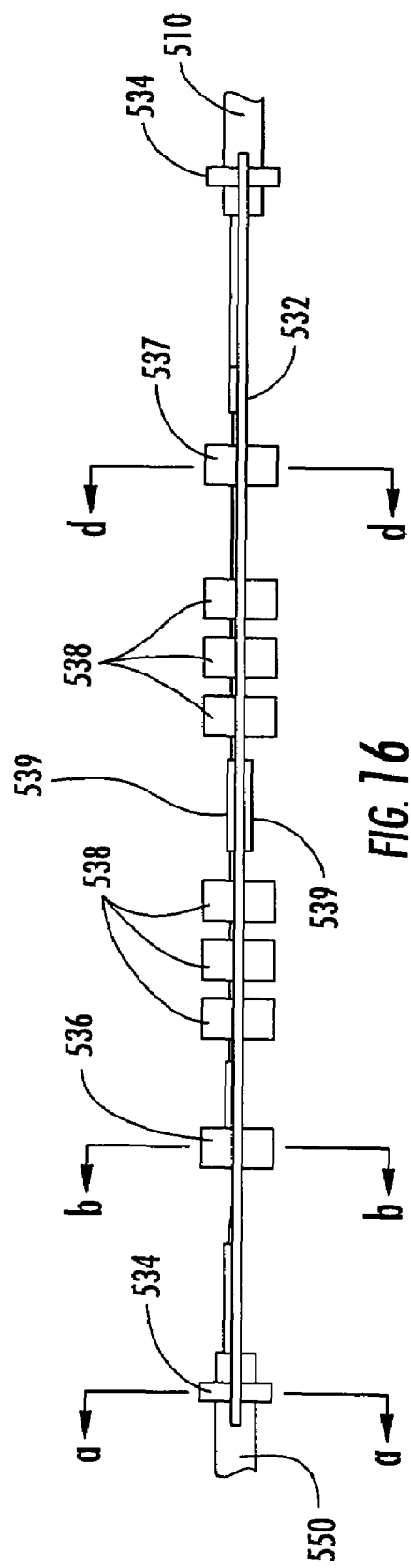

The cross-connect cables remain flexible since cross-connect apparatus 530 has a relatively high degree of flexibility in a preferential bending plane. FIGS. 15 and 16 respectively depict a partial plan view and a partial side view of cross-connect apparatus 530 with a cover 545 removed for explanatory purposes. As depicted, cross-connect apparatus 530 includes a transition strength member 532, at least one cable clamp assembly 534, a first guide assembly 536, a second guide assembly 537, a plurality of fiber storage devices 538, at least one splice holder 539, and cover 545 (FIG. 16g) for protecting the cross-connect apparatus.

Figure 15A:
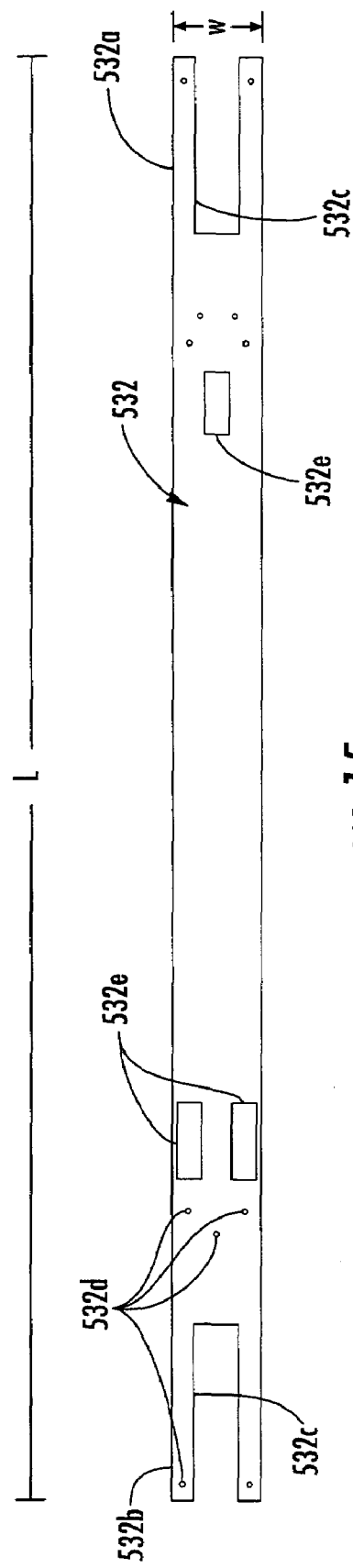

An explanatory transition strength member 532 is depicted in FIG. 15a. Transition strength member 532 is preferably formed from a flexible material that is shaped so it has a preferential bend characteristic. By way of example, transition strength member 532 is formed by a thin piece of spring steel having a thickness of about 0.5 to about 2 millimeters, a width W of about 30 to about 50 millimeters and a length L of about 1 meter or less; however other suitable dimensions are possible. Other embodiments can use a dielectric transition strength member such as formed from fiberglass or any other suitable material. Transition strength member 532 has a first end 532a and a second end 532b with each end having a notched portion 532c. Notched portions 532c are respectively sized so that the first cable and the second cable can fit therein as shown in FIG. 15. Transition strength member 532 also includes a plurality of apertures 532*d* for securing clamp assemblies, guide assemblies, and the like. Additionally, transition strength member 532 can also include one or more slots 532*e* for moving optical fibers or ribbons from one side of transition strength member 532 to the other side, thereby allowing versatility in routing, storage, and splicing within cross-connect apparatus 530.

Figure 16A:
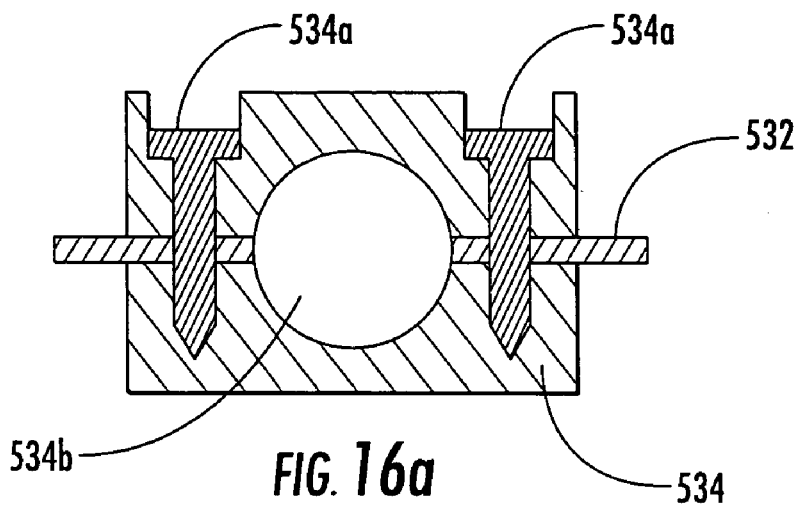
FIGS. 16a–16i show details of the cross-connect of the cross-connect fiber optic cable.

Cross-connect apparatus 530 also includes at least one cable clamp assembly 534 for removably attaching at least one cable section with the transition strength member 532. In this case, cross-connect apparatus includes two cable clamp assemblies 534 one disposed on each end 532*a*, 532*b* of transition strength member 532. Any suitable material(s) may be used for the cable clamp assemblies 534. FIG. 16*a* depicts a cross-sectional view taken along line a-a of FIG. 16 of cable clamp assembly 534. Cable clamp assembly 534 includes two pieces that fit on either side of transition strength member 532 that are attached together by fasteners 534*a* in order to clamp about a jacket of the cable. Specifically, fasteners pass through appropriate apertures 532*d* of transition strength member 532 and thready engage the second piece of the cable clamp assembly. Additionally, cable clamp assembly generally positions the cable centrally within the transition strength member. Preferably, fasteners 534*a* are received in a counter-bore so that they do not protrude from cable clamp assembly 534. Any suitable fastener or fastening means may be used such as screws, bolts, rivets, quarter-turn fasteners, and the like.

Figure 16B:
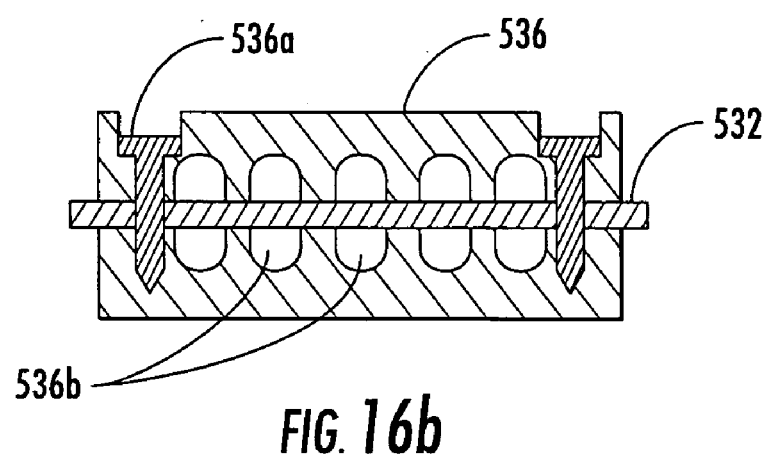
Figure 16C:
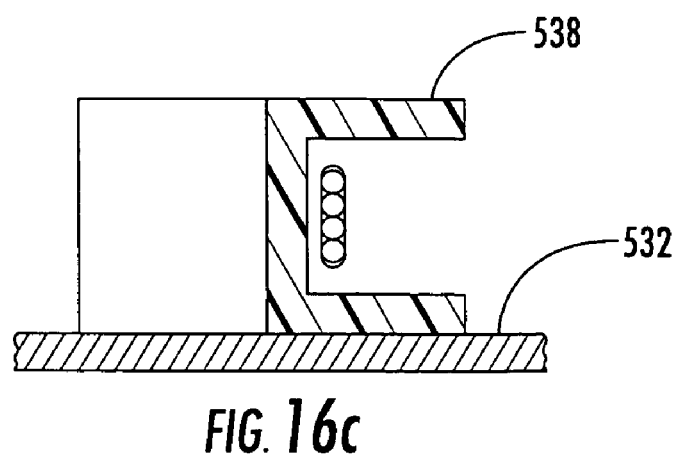
Figure 16D:
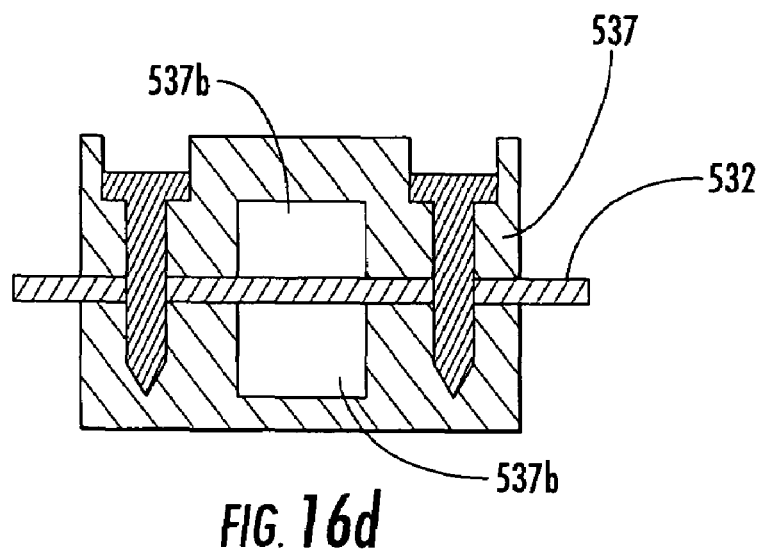

Cross-connect apparatus 530 also includes a first guide assembly 536 and a second guide assembly 537 for organizing and guiding the optical fiber carriers or protective members that are disposed about the ribbonized optical fibers and non-ribbonized optical fibers in optical fiber carriers. Any suitable material(s) may be used for the guide assemblies 536, 537. Guide assemblies 536, 537 should allow the optical fiber carriers, protective members, and/or optical fibers that pass therethrough to have freedom of movement in the longitudinal direction when the cross-connect apparatus 530 is bent. Consequently, any stress on the optical fibers or ribbons during bending is minimal. FIG. 16*b* depicts a cross-sectional view of first guide assembly 536 taken along line b—b of FIG. 16. In this case, first guide assembly 536 is configured for guiding a plurality of tubes, bundles, or the like on either side of transition strength member 532, thereby allowing organization and flexibility in routing. Like cable clamp assemblies 534, the first guide assembly has two pieces disposed on each side of transition strength member 532 that are attached together using fasteners 536*a*. First guide assembly has a plurality of openings 536*b* sized for allowing fiber optic carriers longitudinal freedom of movement while organizing and capturing the same. On the other hand, FIG. 16*d* depicts a cross-sectional view of second guide assembly 537 taken along line d—d of FIG. 16. As shown, second guide assembly 537 is similar to first guide assembly 536, except that openings 537*b* are configured for guiding ribbons that may disposed in one or more protective sheaths. Of course, other suitable guide assemblies are possible with the concepts of the present invention.

Cross-connect apparatus 530 also includes a plurality of fiber storage devices 538 that may be disposed on one or both sides of transition strength member 532. Fiber storage devices are used for wrapping, routing, and organizing optical fibers and/or ribbons from the cable sections that enter at the ends of cross-connect apparatus 530. Fiber storage devices 538 are preferably formed from a pliable material such as a rubber or foam, but other suitable materials are possible. Additionally, fiber storage devices 538 are preferably attached using an adhesive or epoxy, but may be attached in other suitable ways such as a fastener. FIG. 16*c* depicts a cross-sectional view of one fiber storage device 538 taken along line c—c of FIG. 15. As shown, fiber storage device 538 includes flanges (not numbered) to help retain the optical fiber(s) on the same when the cable is bent; however, other suitable fiber storage devices are possible such as a splice carriage that holds a plurality of fiber storage devices. Cross-connect apparatus 530 also includes at least one splice holder 539 for holding the splices between the cable sections that enter at the ends of the cross-connect apparatus 530.

FIG. 15*b* depicts a transition strength member 532' that has a splice carriage 557 with a plurality of fiber storage device 538' and at least one splice holder 539' attached thereto. In this embodiment, splice carriage 557 is removably attached to transition strength member 532' using fasteners (not shown) so that it can be removed during routing and splicing procedures and then be re-attached when the work is completed. Additionally, one large central slot (not numbered) is provided for accommodating splice carriage 557. In this embodiment, fiber storage devices 538' are orientated to organize and store the optical fiber and/or ribbons in loops at about 90 degrees to transition strength member 532'. Consequently, ribbons are stored so that their preferential bending plane is generally aligned with the preferential bending plane of transition strength member 532'. In still further embodiments, splice carriage 557 can be formed so that it is relatively stiffer than transition strength member 532' to influence bending properties of the cross-connect apparatus 530. Furthermore, fiber storage devices 538' may fit with an elongated slot so that they are adjustable relative to splice carriage 557 as shown by the arrow.

Figure 16E:
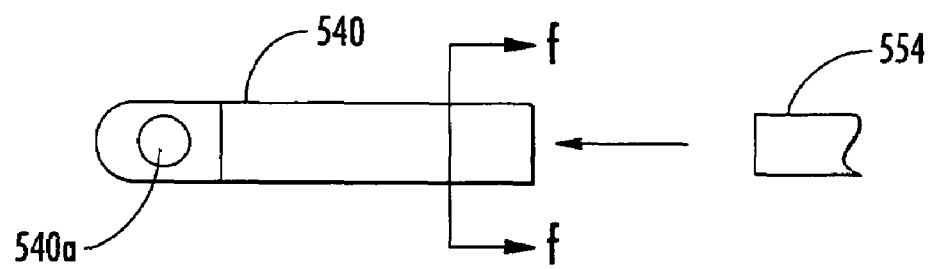
Figure 16F:

Additionally, the first cable section 510 includes at least one first cable section strength member 514 that is secured with transition strength member 532. Likewise, the second cable section 550 includes at least one second cable section strength member 554 that is secured with transition strength member 532. Crimping a portion of transition strength member 532 to strength members of the cable may secure the strength members; however, other suitable structure can accomplish a similar result. For instance, cross-connect apparatus 530 can include one or more strength member endcaps 540 as shown in FIG. 16*e*. Specifically, endcaps 540 have a suitably sized bore as shown by FIG. 16*f* for receiving a strength member 554 or the like. Strength members of the cables are attached to respective endcaps 540 by crimping, epoxy, adhesive or the like. Endcaps 540 are then attached to transition strength member 532 using suitable fasteners attached through an aperture 540*a*. Thus, first and second cable sections 510, 550 can transfer tensile forces to and through the transition strength member 532, thereby inhibiting the transfer of force to the optical fibers.

Figure 16G:
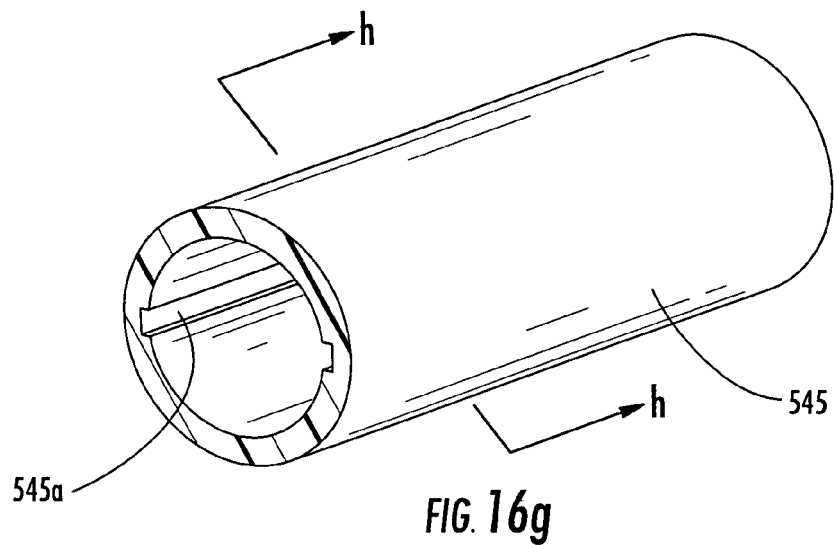
Figure 16H:
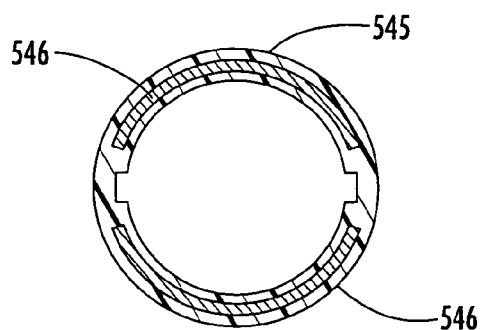
Figure 16I:
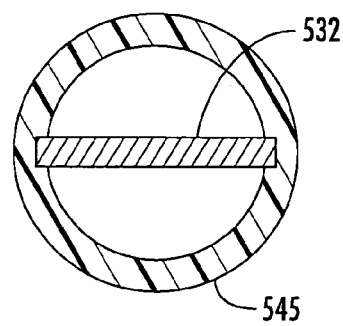

As shown in FIG. 16*g*, cross-connect apparatus 530 also includes cover 545 that slides over the cross-connect apparatus and protects it from environmental effects. Cover 545 is formed from a suitable material that bends, preferably, without kinking for the minimum bend radius. To inhibit kinking, cover 545 may include preferential bending members 546 that are disposed within cover 545. Preferential bending members 546 may be a plurality of discontinuous members as shown in FIG. 16*h* or one or more continuous members such as a helical wire (not shown). Cover 545 also includes guides 545*a* for orientating transition strength member 532 within cover 545 as shown in FIG. 16*i*. Finally, a suitable environmental seal is made on each end between cover 545 and the respective cable sections 510, 550 using suitable materials such as a heat shrink, plugs, filling compound, or the like.

Many modifications and other embodiments of the present invention, within the scope of the appended claims, will become apparent to a skilled artisan. For example, the cables of the present invention can have other configurations such as fewer or more cable components. By way of example, a cable could eliminate components like the central member in a suitable fashion or further include any suitable cable components. Additionally, any suitable materials may be used for cable components such as flame retardant and/or UV resistant materials, thereby making cable suitable for indoor, outdoor, or both applications. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides as well.

That which is claimed:

1. A cross-connect fiber optic cable having a head portion that includes a plurality of optical fibers in at least one ribbon and the tail portion of the transition fiber optic cable includes optical fibers in a format that does not match the plurality of optical fibers disposed in the head portion, comprising:
    a first cable section, the first cable section having a plurality of optical fibers that are a portion of a fiber optic ribbon and at least one first cable section strength member;
    a second cable section, the second cable section having a plurality of tubes and at least one second cable section strength member, each respective tube having at least one optical fiber therein; and
    a cross-connect apparatus, the cross-connect apparatus having a transition strength member having a first end and a second end, wherein the first end of the transition strength member is secured with the at least one first cable section strength member and the second end of the transition strength member is secured with the at least one second cable section strength member for transferring tensile forces between the first cable section and second cable section strength members, and one or more of the plurality of optical fibers that are disposed in the ribbon of the first cable section are in optical communication with one or more of the respective optical fibers of the second cable section.

2. The cross-connect fiber optic cable of claim 1, the cross-connect apparatus having a protective covering thereof for sealing the cross-connect apparatus from the environment.

3. The cross-connect fiber optic cable of claim 1, the transition strength member being a flexible plate.

4. The cross-connect fiber optic cable of claim 1, the transition strength section further including at least one cable clamp assembly.

5. The cross-connect fiber optic cable of claim 1, the cross-connect apparatus further including at least one endcap for securing at least one strength member of one of the first or second cable sections.

6. The cross-connect fiber optic cable of claim 1, the cross-connect apparatus including a splice carriage, the splice carriage being removably attached to the transition strength member.

7. The cross-connect fiber optic cable of claim 1, the cross-connect apparatus further including at least one guide assembly.

8. The cross-connect fiber optic cable of claim 1, the cross-connect apparatus further including at least one fiber storage device.

9. The cross-connect fiber optic cable of claim 1, the first cable section excluding a filling compound in contact with the fiber optic ribbon.

10. The cross-connect fiber optic cable of claim 1, one or more of the first or second cable sections having an access location.

11. The cross-connect fiber optic cable of claim 10, the at least one access location having a tether cable in optical communication with at least one access optical fiber.

12. The cross-connect fiber optic cable of claim 10, the transition fiber optic cable having a minimum bend radius of about 24 inches or less.

13. A cross-connect apparatus for cross-connecting fiber optic cables that is flexible, comprising:
    a transition strength member, the transition strength member having a first end and a second end, wherein the transition strength member is flexible about a preferential bending plane;
    at least one cable clamp assembly, the at least one cable clamp assembly being capable of securing a cable with the transition strength member;
    at least one fiber storage device; and
    a cover for protecting the cross-connect apparatus.

14. The cross-connect apparatus of claim 13, the transition strength member being a flexible plate.

15. The cross-connect apparatus of claim 13, the cross-connect apparatus having a minimum bend radius of about 24 inches or less.

16. The cross-connect apparatus of claim 13, further including at least one endcap for securing at least one strength member of a cable with the transition strength member.

17. The cross-connect apparatus of claim 13, further including a splice carriage, the splice carriage being removably attached to the transition strength member.

18. The cross-connect apparatus of claim 13, further including at least one guide assembly.

19. The cross-connect apparatus of claim 13, further including at least one fiber storage device.

20. A cross-connect apparatus for cross-connecting fiber optic cables that is flexible, comprising:
    a transition strength member, the transition strength member having a first end and a second end, wherein the transition strength member is flexible about a preferential bending plane;
    at least one cable clamp assembly, the at least one cable clamp assembly being capable of securing a cable with the transition strength member;
    a splice carriage, the splice carriage being removably attached to the transition strength member; and
    a cover for protecting the cross-connect apparatus.

21. The cross-connect apparatus of claim 20, the transition strength member being a flexible plate.

22. The cross-connect apparatus of claim 20, the cross-connect apparatus having a minimum bend radius of about 24 inches or less.

23. The cross-connect apparatus of claim 20, further including at least one fiber storage device, the at least one fiber storage device being a portion of the splice carriage.

24. The cross-connect apparatus of claim 20, further including at least one endcap for securing at least one strength member of a cable with the transition strength member.

25. The cross-connect apparatus of claim 13, further including at least one guide assembly.

* * * * *